United States Patent
Li

(10) Patent No.: US 12,489,932 B2
(45) Date of Patent: Dec. 2, 2025

(54) LIVE STREAMING MEDIA

(71) Applicant: Tencent Technology (Shenzhen) Company Limited, Shenzhen (CN)

(72) Inventor: Zhicheng Li, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 18/644,232

(22) Filed: Apr. 24, 2024

(65) Prior Publication Data

US 2024/0283986 A1  Aug. 22, 2024

Related U.S. Application Data

(63) Continuation of application No. PCT/CN2023/094147, filed on May 15, 2023.

(30) Foreign Application Priority Data

Jul. 29, 2022 (CN) .......................... 202210904547.9

(51) Int. Cl.
*H04N 21/231* (2011.01)
*H04N 21/2187* (2011.01)
(Continued)

(52) U.S. Cl.
CPC ... *H04N 21/23106* (2013.01); *H04N 21/2187* (2013.01); *H04N 21/2343* (2013.01); *H04N 21/8456* (2013.01)

(58) Field of Classification Search
CPC ......... H04N 21/23106; H04N 21/2187; H04N 21/2343; H04N 21/8456; H04N 21/23406; H04N 19/436
See application file for complete search history.

(56) References Cited

U.S. PATENT DOCUMENTS

2005/0223131 A1* 10/2005 Goekjian ................ G06F 13/28
2022/0094924 A1   3/2022 Guo et al.

FOREIGN PATENT DOCUMENTS

CN   103650501 A   3/2014
CN   107197296 A   9/2017
(Continued)

OTHER PUBLICATIONS

China National Patent Office, Office Action, dated Oct. 31, 2024, for Chinese Patent Application No. CN 202210904547.9.
(Continued)

*Primary Examiner* — Anthony Bantamoi
(74) *Attorney, Agent, or Firm* — Banner & Witcoff, Ltd.

(57) ABSTRACT

A live streaming media data processing method is provided, performed by a computer device, and including: caching live streaming media source data, and slicing the cached live streaming media source data based on a preset slicing granularity in response to a streaming media duration of the cached live streaming media source data reaching a target caching duration, to obtain a plurality of independently codable streaming media segments, a numerical value of the target caching duration being greater than a numerical value of the preset slicing granularity; performing, by using at least two coding servers, parallel coding on the streaming media segments obtained through the slicing, to obtain respective coded video data of the coding servers, an overall code rate of the at least two coding servers being not less than a frame rate of the live streaming media source data; and merging the respective coded video data of the coding servers to obtain coded live streaming media data configured for transmission to a live streaming client.

20 Claims, 7 Drawing Sheets

(51) Int. Cl.
    *H04N 21/2343*     (2011.01)
    *H04N 21/845*     (2011.01)

(56) References Cited

FOREIGN PATENT DOCUMENTS

| | | | |
|---|---|---|---|
| CN | 109831676 A | | 5/2019 |
| CN | 109862357 A | | 6/2019 |
| CN | 110933436 A | | 3/2020 |
| CN | 111294612 A | | 6/2020 |
| CN | 112929583 A | * | 6/2021 |
| CN | 114173145 A | | 3/2022 |
| CN | 114257839 A | | 3/2022 |
| CN | 115278302 A | | 11/2022 |
| JP | 2017195477 A | | 10/2017 |
| JP | 2019161424 A | * | 9/2019 |
| WO | 2021/101066 A1 | | 5/2021 |

OTHER PUBLICATIONS

Sep. 11, 2023—(WO) International Search Report and Written Opinion—PCT/CN2023/094147.
Hashemizadehnaeini, Shabnam, "Transcoding H.264 Video via FFMPG encoder," Jan. 1, 2015, pp. 1-152.
May 13, 2025—Extended EP Search Report—Application No. 23844987.0.

\* cited by examiner

US 12,489,932 B2

LIVE STREAMING MEDIA

CROSS REFERENCE TO RELATED APPLICATIONS

This application is a continuation of PCT Application PCT/CN2023/094147, filed May 15, 2023, which claims priority to Chinese Patent Application No. 2022109045479, filed with the China National Intellectual Property Administration on Jul. 29, 2022, and each entitled "LIVE STREAMING MEDIA DATA PROCESSING METHOD, SYSTEM, AND APPARATUS, AND COMPUTER DEVICE", each of which is incorporated herein by reference in its entirety.

FIELD

This application relates to the field of computer technologies, and in particular, to a live streaming media data processing method, system, and apparatus, a computer device, a storage medium, and a computer program product.

BACKGROUND

With the development of computer technologies, live streaming forms are increasingly diversified. Through live video streaming, sites of contents such as product display, related conferences, background introduction, scheme evaluation, online surveys, dialogue interviews, online training, games, entertainment may be posted on the Internet. An effect of live streaming activities is enhanced by using characteristics of the Internet such as intuition, speediness, a desirable expression form, rich content, and strong interaction. With the development of audio/video technologies, an amount of data in a streaming media such as audio/video in live video streaming sharply increases, which has increasingly high requirements for computing power of real-time coding. Therefore, playing may be stalled during live video streaming, which affects live streaming.

SUMMARY

According to various aspects provided in this application, a live streaming media data processing method, system, and apparatus, a computer device, a computer-readable storage medium, and a computer program product are provided.

According to a first aspect, this application provides a live streaming media data processing method, performed by a computer device. The method includes:
  caching live streaming media source data, and slicing the cached live streaming media source data based on a preset slicing granularity in response to a streaming media duration of the cached live streaming media source data reaching a target caching duration, to obtain a plurality of independently codable streaming media segments, a numerical value of the target caching duration being greater than a numerical value of the preset slicing granularity;
  performing, by using at least two coding servers, parallel coding on the streaming media segments obtained through the slicing, to obtain respective coded video data of the coding servers, an overall code rate of the at least two coding servers being not less than a frame rate of the live streaming media source data; and
  merging the respective coded video data of the coding servers to obtain coded live streaming media data, the coded live streaming media data being configured for transmission to a live streaming client.

According to a second aspect, this application provides a live streaming media data processing system. The system includes: a slicing server, a merging server, and a coding server cluster including at least two coding servers;
  the slicing server being configured to cache live streaming media source data, and slice the cached live streaming media data based on a preset slicing granularity in response to a streaming media duration of the cached live streaming media source data reaching a target caching duration, to obtain a plurality of independently codable streaming media segments, a numerical value of the target caching duration being greater than a numerical value of the preset slicing granularity;
  the coding server cluster being configured to perform, by using at least two coding servers, parallel coding on the streaming media segments obtained through the slicing, to obtain respective coded video data of the coding servers; and
  the merging server being configured to merge the respective coded video data of the coding servers to obtain coded live streaming media data, the coded live streaming media data being configured for transmission to a live streaming client.

According to a third aspect, this application further provides a live streaming media data processing apparatus. The apparatus includes:
  a live streaming slicing module, configured to cache live streaming media source data, and slice the cached live streaming media source data based on a preset slicing granularity in response to a streaming media duration of the cached live streaming media source data reaching a target caching duration, to obtain a plurality of independently codable streaming media segments, a numerical value of the target caching duration being greater than a numerical value of the preset slicing granularity;
  a parallel slice coding module, configured to perform, by using at least two coding servers, parallel coding on the streaming media segments obtained through the slicing, to obtain respective coded video data of the coding servers, an overall code rate of the at least two coding servers being not less than a frame rate of the live streaming media source data; and
  a coded data merging module, configured to merge the respective coded video data of the coding servers, to obtain coded live streaming media data, the coded live streaming media data being configured for transmission to a live streaming client.

According to a fourth aspect, this application further provides a computer device. The computer device includes a memory and a processor, the memory having a computer-readable instruction stored therein, and the processor, when executing the computer-readable instruction, implementing the operations of the foregoing live streaming media data processing method.

According to a fifth aspect, this application further provides a computer-readable storage medium. The computer-readable storage medium has a computer-readable instruction stored thereon, the computer-readable instruction, when executed by a processor, implementing the operations of the foregoing live streaming media data processing method.

According to a sixth aspect, this application further provides a computer program product. The computer program product includes a computer-readable instruction, the computer-readable instruction, when executed by a processor, implementing the operations of the foregoing live streaming media data processing method.

Details of one or more aspects of this application are provided in the following accompanying drawings and descriptions. Other features, objectives, and advantages of this application become apparent from the specification, the accompanying drawings, and the claims.

DETAILED DESCRIPTION

To make objectives, technical solutions, and advantages of this application clearer, this application is further described in detail below with reference to accompanying drawings and aspects. The specific aspects described herein are merely intended to explain this application, but are not intended to limit this application.

Figure 1:
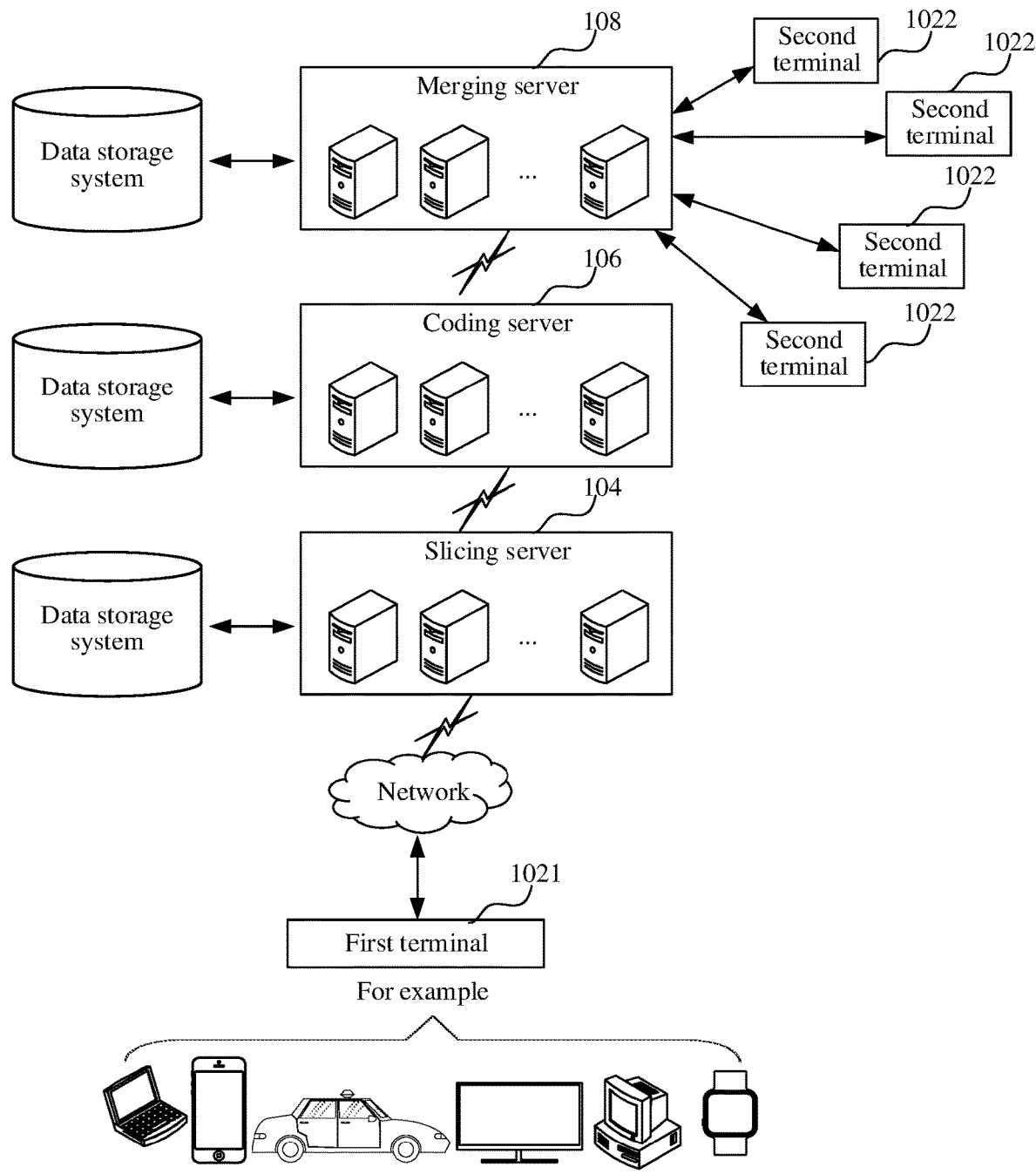
FIG. 1 is a diagram of an application environment of a live streaming media data processing method according to one or more illustrative aspects described herein.

Aspects of this application may be applied to various scenarios, including but not limited to cloud technology, artificial intelligence, intelligent transportation, assisted driving, and the like. Specifically, a live streaming media data processing method may be applied to an application environment shown in FIG. 1. A terminal includes a first terminal 1021 and a second terminal 1022. The first terminal 1021 communicates with a slicing server 104 through a network, the second terminal 1022 communicates with a merging server 108 through the network, and a coding server 106 respectively communicates with the slicing server 104 and the merging server 108 through the network. A data storage system may store data to be processed in a corresponding server. The data storage system may be integrated on the corresponding server, or may be arranged on the cloud or another server. A live streamer may collect live streaming media data through the first terminal 1021, and transmits the collected live streaming media data to the slicing server 104. The slicing server 104 caches live streaming media source data transmitted by the first terminal 1021. When a streaming media duration of the cached live streaming media source data reaches a target caching duration, slicing of the cached live streaming media source data based on a preset slicing granularity is triggered to obtain a plurality of independently codable streaming media segments, and the plurality of streaming media segments are transmitted to at least two coding servers 106. At least two coding servers 106 whose overall code rate is not less than a frame rate of the live streaming media source data perform parallel coding on the streaming media segments obtained through the slicing, and transmit the obtained respective coded video data of the coding servers to the merging server 108. The merging server 108 merges the respective coded video data of the coding servers to obtain coded live streaming media data for transmission to a live streaming client. The merging server 108 may transmit the merged coded live streaming media data to each second terminal 1022, so that the second terminal 1022 decodes the coded live streaming media data for playing. An audience user may watch live video streaming through the second terminal 1022.

The terminal including the first terminal 1021 and the second terminal 1022 may be, but is not limited to, various desktop computers, notebook computers, smartphones, tablet computers, Internet of Things devices, and portable wearable devices. An Internet of Thing device may be a smart speaker, a smart television, a smart air conditioner, a smart onboard device, or the like. The portable wearable device may be a smartwatch, a smart bracelet, a head-mounted device, and the like. Each of the servers such as the slicing server 104, the coding server 106, and the merging server 108 may be an independent physical server, or may be a server cluster formed by a plurality of physical servers or a distributed system, and may further be a cloud server providing basic cloud computing services such as cloud service, a cloud database, cloud computing, a cloud function, cloud storage, a network service, cloud communication, a middleware service, a domain name service, a security service, a CDN, and a big data and artificial intelligence platform. The terminal and the server may be directly or indirectly connected through wired or wireless communication, which is not limited herein in this application.

Figure 2:
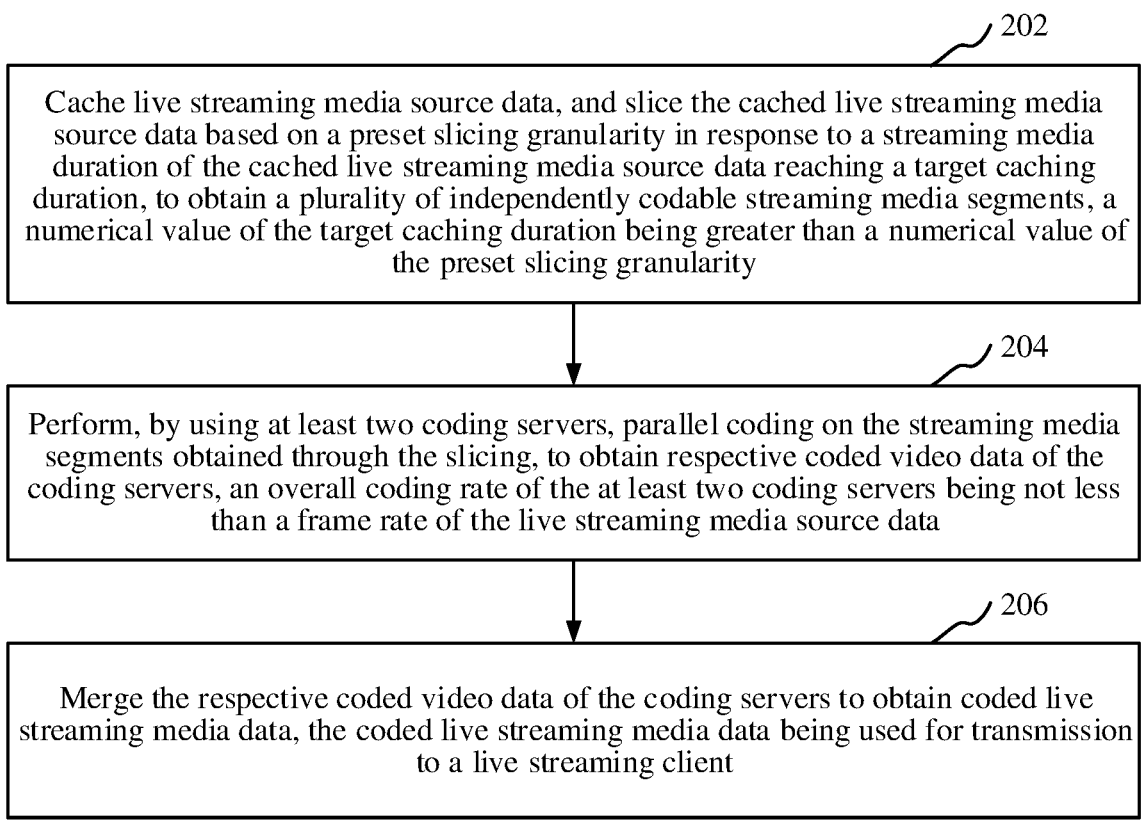
FIG. 2 is a schematic flowchart of a live streaming media data processing method according to one or more illustrative aspects described herein.

In an embodiment, as shown in FIG. 2, a live streaming media data processing method is provided. The method is performed by a computer device. The method may be applied to the various servers in FIG. 1 for description purposes. The method includes the following operations.

Operation 202: Cache live streaming media source data, and slice the cached live streaming media source data based on a preset slicing granularity in response to a streaming media duration of the cached live streaming media source data reaching a target caching duration, to obtain a plurality of independently codable streaming media segments, a numerical value of the target caching duration being greater than a numerical value of the preset slicing granularity.

A streaming media technology is a technology of compressing a series of media data and transmitting the data in segments in a streaming manner, to implement real-time transmission of audio/video on a network for viewing. Live streaming media is streaming media generated during live video streaming, and the live streaming media source data is original streaming media data directly generated by a live streamer terminal during live streaming. The streaming media duration is a cumulative duration of the cached live streaming media source data during caching of the live streaming media source data. The target caching duration is a preset caching duration that needs to be achieved. The target caching duration may be set based on an actual requirement, to ensure that parallel coding can be performed through a plurality of coding servers. A slicing granularity is a duration of a single slice during slicing of the live streaming media source data. The target caching duration is positively correlated with the preset slicing granularity. To be specific, a finer preset slicing granularity indicates a larger numerical value of the target caching duration. To be specific, more live streaming media source data needs to be cached before slicing is triggered. Therefore, the numerical value of the target caching duration is greater than the numerical value of the preset slicing granularity. The streaming media segment is an independently codable slice segment obtained after the live streaming media source data is sliced. Each streaming media segment is an independently codable segment, which can avoid cross influence between different streaming media segments, thereby ensuring that the merged coded video data can be played smoothly and clearly.

Specifically, when a live streamer triggers live video streaming, a server may cache live streaming media source data generated by the live streamer terminal. The server collects statistics about the streaming media duration of the cached live streaming media source data. When the streaming media duration reaches the preset target caching duration, it indicates that the server has cached a sufficient amount of live streaming media source data, and a plurality of coding servers may be allowed to perform parallel coding. The server slices the cached live streaming media source data based on the preset slicing granularity, which may specifically perform slicing at an equal duration based on the preset slicing granularity, to obtain a plurality of independently codable streaming media segments with a same duration. The target caching duration is positively correlated with the preset slicing granularity. The slicing granularity may be set based on an actual requirement, for example, may be 0.5 seconds, 1 second, or 2 seconds. Based on the set slicing granularity, the corresponding target caching duration may be set, so that the target caching duration is positively correlated with the preset slicing granularity. For example, when the preset slicing granularity is 1 second, the target caching duration may be set to 12 seconds, and when the preset slicing granularity is 0.5 seconds, the target caching duration may be set to 6 seconds. The numerical value of the target caching duration is greater than the numerical value of the preset slicing granularity, which may be specifically an integer multiple of the numerical value of the preset slicing granularity. A specific multiple relationship may be determined based on a quantity of coding servers that participate in parallel coding. For example, if K coding servers are arranged, to satisfy parallel coding by the K coding servers, a streaming media duration that needs to be cached is at least K times the preset slicing granularity, thereby ensuring that at least one piece of streaming media data at a preset slicing granularity can be allocated to each of the K coding servers for coding, thereby implementing parallel coding by the K coding servers.

Operation 204: Perform, by using at least two coding servers, parallel coding on the streaming media segments obtained through the slicing, to obtain respective coded video data of the coding servers, an overall code rate of the at least two coding servers being not less than a frame rate of the live streaming media source data.

The coding server is a server configured to perform video coding processing. At least two coding servers are arranged, so that parallel coding may be performed by using the at least two coding servers. During the parallel coding, each coding server may code the streaming media segment allocated thereto. For example, if 12 streaming media segments are obtained, and a slicing granularity of each streaming media segment is 1 second, i.e., a duration of each streaming media segment is 1 second, the streaming media segments may be respectively coded by using 12 coding servers, so that the 12 coding servers simultaneously code the 12 streaming media segments obtained through the slicing, to obtain the respective coded video data of the coding servers. The coded video data is a video coding result obtained by coding the streaming media segment by the coding server. The streaming media segment may be compressed through coding, to reduce a data volume of the streaming media segment and obtain coded video data that is convenient for transmission and storage. The overall code rate is a code rate of the coding servers as a whole during parallel coding. The frame rate of the live streaming media source data is a quantity of pictures generated by the live streaming media source data per unit time.

Specifically, parallel coding is performed, by using the at least two coding servers, on the streaming media segments obtained through the slicing, and each of the coding servers obtains respective coded video data. The quantity of the coding servers matches a quantity of the streaming media segments obtained through the slicing. In a specific application, the quantity of the coding servers that trigger parallel coding per unit time is the same as the quantity of the streaming media segments sliced per unit time. Therefore, parallel coding may be performed on each streaming media segment sliced per unit time by using different coding servers, which can improve coding efficiency. The overall code rate of the at least two coding servers that perform parallel coding is not less than the frame rate of the live streaming media source data, so that the overall code rate of parallel coding can match the frame rate of the live streaming media source data, which avoids stuttering as a result of the coding efficiency problem during live streaming, and ensures smooth playing of live streaming media, thereby ensuring live streaming.

Operation 206: Merge the respective coded video data of the coding servers to obtain coded live streaming media data, the coded live streaming media data being configured for transmission to a live streaming client.

The coded live streaming media data is a coding and merging result obtained by merging the respective coded video data obtained by the coding servers. The coded live streaming media data is configured for transmission to the live streaming client to be played in the live streaming client. Specifically, the server may merge the respective coded video data of the coding servers to obtain the coded live streaming media data transmitted to the live streaming client, thereby implementing coding of the live streaming media data. In a specific application, the merging of the respective coded video data of the coding servers and the slicing of the cached live streaming media source data based on the preset slicing granularity may be performed by the same server or different servers. For example, the slicing of the cached live streaming media source data based on the preset slicing granularity may be performed by the slicing server, parallel coding of the streaming media segments obtained through the slicing may be performed by a plurality of coding servers, and the merging of the respective coded video data of the coding servers may be performed by the merging server. The slicing server and the merging server may be arranged as the same server, or may be different servers arranged separately.

According to the live streaming media data processing method, when the streaming media duration of the cached live streaming media source data reaches the target caching duration, slicing of the cached live streaming media source data is triggered based on the preset slicing granularity, to obtain the plurality of independently codable streaming media segments. By using the at least two coding servers whose overall code rate is not less than the frame rate of the live streaming media source data, parallel coding is performed on the streaming media segments obtained through the slicing, and the obtained respective coded video data of the coding servers is merged to obtain the coded live streaming media data for transmission to the live streaming client. During processing of the live streaming media data, if the streaming media duration of the cached live streaming media source data reaches the target caching duration, and the overall code rate of the at least two coding servers is not less than the frame rate of the live streaming media source data, it can be ensured that processing efficiency of parallel coding performed on the streaming media segments obtained through the slicing by using the at least two coding servers matches the frame rate of the live streaming media source data, which avoids stuttering as a result of the coding efficiency problem during live streaming, thereby ensuring live streaming.

The preset slicing granularity may include an integer multiple of a granularity of a preset group of pictures (GOP). The slicing the cached live streaming media source data based on a preset slicing granularity in response to a streaming media duration of the cached live streaming media source data reaching a target caching duration, to obtain a plurality of independently codable streaming media segments includes: collecting statistics about the streaming media duration of the cached live streaming media source data; slicing, when the streaming media duration reaches a preset target caching duration, the cached live streaming media source data based on the integer multiple of the granularity of the preset GOPs, to obtain the plurality of independently codable streaming media segments.

The preset slicing granularity includes the integer multiple of the granularity of the preset GOP. A GOP is an interval between two intra-coded image frames during video coding. The intra-coded image frame is an image frame that can be coded only by using information of a current frame without referring to another image frame. The preset slicing granularity is the integer multiple of the granularity of the preset GOP, which can ensure that the streaming media segments sliced based on the preset slicing granularity are all independently codable slice segments.

Specifically, when the server caches the live streaming media source data, statistics may be collected about the streaming media duration of the cached live streaming media source data, and it indicates that the current cached live streaming media source data has been able to support a plurality of coding servers for parallel coding when the streaming media duration reaches the preset target caching duration. The server slices the cached live streaming media source data based on the integer multiple of the granularity of the preset GOP, to obtain the plurality of independently codable streaming media segments. During the coding, each GOP may be independently coded. The live streaming media source data is sliced based on the integer multiple of the granularity of the GOP, which may ensure that the plurality of streaming media segments obtained through the slicing are independently codable, which is beneficial to ensure a playing effect of the coded live streaming media data.

The server may slice the cached live streaming media source data based on the integer multiple of the granularity of the preset GOP, which can ensure that the plurality of streaming media segments obtained through the slicing are independently codable segments, so that coding and decoding of the streaming media segments are effectively isolated, which is beneficial to ensure the playing effect of the coded live streaming media data.

The slicing the cached live streaming media source data based on the integer multiple of the granularity of the preset GOP, to obtain the plurality of independently codable streaming media segments may include: slicing the cached live streaming media source data at an equal granularity based on the integer multiple of the granularity of the preset GOP, to obtain a plurality of pieces of independently codable live streaming media slice data with a same duration; and respectively encapsulating the plurality of pieces of live streaming media slice data based on a target encapsulation format, to obtain a plurality of streaming media segments in the target encapsulation format.

Slicing at an equal granularity means that segments are sliced at the same granularity. For example, the granularity is 1 second or 0.5 seconds. The live streaming media slice data is slice segments obtained by slicing the cached live streaming media source data at an equal granularity. Each live streaming media slice data is obtained through slicing at an equal granularity. To be specific, each live streaming media slice data has the same duration. Each live streaming media slice data is obtained through slicing based on the integer multiple of the granularity of the preset GOP. To be specific, each live streaming media slice data is an independently codable slice segment. An encapsulation format is also referred to as a container, which means putting a coded and compressed video track and audio track into a file in a specific format. As a container for a coded video, the encapsulation format may include a head/tail identifier and video description information to identify a video included in the encapsulation format. The encapsulation format may include various formats such as avi, flv, MP4, rmvb, mkv, or ts. The target encapsulation format is a preset encapsulation format.

Specifically, the server slices the cached live streaming media source data at an equal granularity based on the integer multiple of the granularity of the preset GOP, to obtain the plurality of independently codable streaming media slice data. Each live streaming media slice data has the same duration. The server queries for a preset target encapsulation format, and respectively encapsulates the plurality of pieces of live streaming media slice data separately based on the target encapsulation format, to obtain a plurality of streaming media segments in the target encapsulation format. The server re-encapsulates the live streaming media slice data obtained through slicing in the target encapsulation format, to obtain a plurality of streaming media segments in an encapsulation format that is the target encapsulation format, for example, a plurality of streaming media segments in an encapsulation format that is the ts format.

The server may slice the cached live streaming media source data at an equal granularity based on the integer multiple of the granularity of the preset GOP, which can ensure that the plurality of independently codable streaming media segments obtained through the slicing are segments with the same duration, and the live streaming media slice data obtained through slicing is encapsulated into the plurality of streaming media segments in the target encapsulation format, so that coding and decoding of the streaming media segments are effectively isolated, which is beneficial to ensure the playing effect of the coded live streaming media data.

A target quantity of streaming media segments may be provided. The performing, by using at least two coding servers, parallel coding on the streaming media segments obtained through the slicing, to obtain respective coded video data of the coding servers includes: performing, by using at least the target quantity of coding servers, parallel coding on the streaming media segments obtained through the slicing, to obtain the respective coded video data of the coding servers, an overall code rate of the at least the target quantity of coding servers being not less than a frame rate of the live streaming media source data.

The target quantity of streaming media segments are provided. To be specific, the target quantity of streaming media segments are obtained through slicing. The target quantity is positively correlated with the frame rate of the live streaming media source data, and is negatively correlated with an independent code rate of the coding server. To be specific, a higher frame rate of the live streaming media source data indicates a larger target quantity, and a higher independent code rate of the coding server indicates a smaller target quantity. The independent code rate is a code rate when a single coding server performs coding independently. When the target caching duration is fixed, an overall duration of a plurality of partitioned streaming media segments is fixed. If an overall code rate of a plurality of coding servers is obtained by summing respective independent code rates of the coding servers, higher respective independent code rates of the coding servers lead to fewer coding servers (i.e., fewer streaming media segments to be partitioned) that may be used for implementing parallel coding in a case that the same overall code rate is ensured. In addition, a higher frame rate of live streaming media source data indicates a larger amount of streaming media source data that needs to be processed per unit time to ensure live streaming, and indicates a higher overall code rate of the plurality of coding servers that is required. In a case that the respective independent code rates of the coding servers are fixed, more coding servers are required for parallel coding, i.e., a larger quantity of streaming media segments need to be partitioned.

Specifically, when the parallel coding is performed by using the plurality of coding servers, parallel coding is performed, by using at least the target quantity of coding servers, on the streaming media segments obtained through the slicing, to obtain the respective coded video data of the coding servers. To be specific, a quantity of coding servers is not less than a quantity of streaming media segments. Each streaming media segment may correspond to one coding server, so that parallel coding is performed on the streaming media segments by using the at least the target quantity of coding servers. The overall code rate of the at least the target quantity of coding servers is not less than the frame rate of the live streaming media source data. To be specific, the overall code rate of the plurality of coding servers is higher than or equal to the frame rate of the live streaming media source data. In this way, the coding efficiency for the live streaming media source data can match the frame rate, and stuttering as a result of the coding efficiency problem may be avoided, thereby ensuring live streaming.

By using at least the target quantity of coding servers whose overall code rate is not less than the frame rate of the live streaming media source data, parallel encoding may be performed on the streaming media segments obtained through the slicing, to obtain the respective coded video data of the coding servers. In this way, the coding efficiency for the live streaming media source data can match the frame rate, the stuttering as a result of the coding efficiency problem may be avoided, and a delay is reduced, thereby ensuring live streaming.

Figure 3:
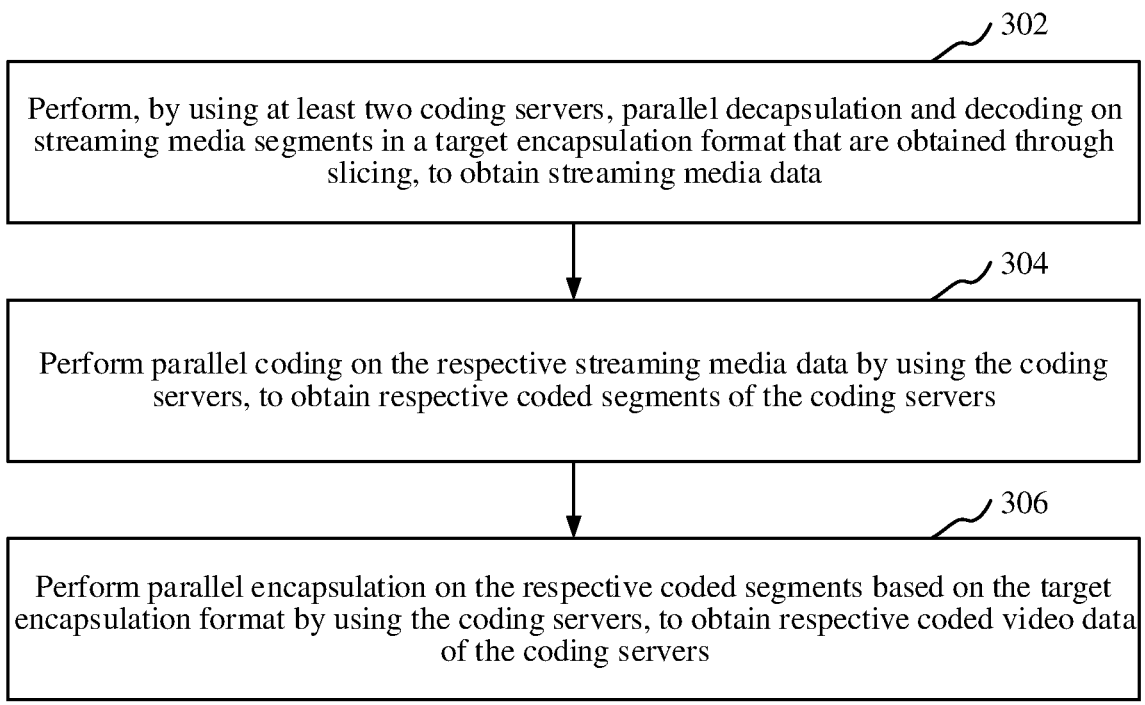
FIG. 3 is a schematic flowchart of parallel coding processing according to one or more illustrative aspects described herein.

The plurality of streaming media segments may be in a target encapsulation format. As shown in FIG. 3, the performing, by using at least two coding servers, parallel coding on the streaming media segments obtained through the slicing, to obtain respective coded video data of the coding servers includes the following operations:

Operation 302: Perform, by using at least two coding servers, parallel decapsulation and decoding on streaming media segments in the target encapsulation format that are obtained through the slicing, to obtain streaming media data.

The plurality of streaming media segments are in the target encapsulation format. To be specific, the plurality of streaming media segments are individually encapsulated into the target encapsulation formats. Decapsulation refers to removal of an encapsulation format to obtain coded video data. Decoding means decoding and restoring the coded video data to video data. Specifically, parallel decapsulation and decoding are performed, by using the at least two coding servers, on the streaming media segments in the target encapsulation format that are obtained through the slicing, and each coding server performs decapsulation and decoding on the streaming media segments allocated to the coding server, to obtain the streaming media data. The streaming media data is slicing data that is not coded or encapsulated.

Operation 304: Perform parallel coding on the respective streaming media data by using the coding servers, to obtain respective coded segments of the coding servers.

Specifically, parallel coding is performed on the respective streaming media data by using the coding servers. Specifically, the parallel coding may be performed by using a preset coding algorithm such as the H.265 coding algorithm, to obtain the respective coded segments of the coding servers. The coded segment is a coding result segment obtained after video coding is performed on the streaming media data.

Operation 306: Perform parallel encapsulation on the respective coded segments based on the target encapsulation format by using the coding servers, to obtain the respective coded video data of the coding servers.

Specifically, parallel encapsulation is performed on the obtained respective coded segments based on the target encapsulation format by using the coding servers, i.e., the coded segments are encapsulated again based on the target encapsulation format, to obtain the respective coded video data of the coding servers. The coded video data and the streaming media segment are both in the target encapsulation format.

The streaming media segments in the target encapsulation format may be decapsulated and decoded and then coded by the coding server, and the coded segments obtained through coding are encapsulated into the target encapsulation format again, to obtain the coded video data in the target encapsulation format. Through encapsulation of the coded video data into the same target encapsulation format as the streaming media segments, it is convenient to manage the coded video data, thereby facilitating improvement of processing efficiency of the live streaming media data.

The live streaming media data processing method may further include: obtaining the preset slicing granularity configured for processing of the live streaming media source data; determining a live streaming processing delay based on the preset slicing granularity, the frame rate of the live streaming media source data, and an independent code rate of the coding server; and determining the target caching duration based on the live streaming processing delay, the target caching duration being not less than the live streaming processing delay.

The preset slicing granularity may be preset before the live streaming media source data is processed, for example, preset to 1 second or 0.5 seconds or another slicing granularity. The live streaming processing delay is a live streaming delay caused through processing of the live streaming media data. For example, a frame rate of the live streaming media source data is 60 frames per second (FPS, a refresh rate), and the independent code rate of the coding server is 5 FPS. If the preset slicing granularity is 1 second, the live streaming processing delay may be 60*⅕=12 seconds. FPS is a definition in the field of images, and is a quantity of frames of a picture transmitted per second. Generally speaking, FPS is a quantity of pictures in an animation or a video. FPS is a measure of an amount of information for storing and displaying dynamic videos. A larger quantity of frames per second leads to smooth actions to be displayed. The live streaming processing delay is positively correlated with the preset slicing granularity and the frame rate of the live streaming media source data, and the live streaming processing delay is negatively correlated with the independent code rate of the coding server. To be specific, a larger preset slicing granularity or a higher frame rate of the live streaming media source data indicates a longer live streaming processing delay. A higher independent code rate of the coding server indicates a shorter live streaming processing delay.

Specifically, the live streaming processing delay is calculated based on the preset slicing granularity, the frame rate of the live streaming media source data, and the independent code rate of the coding server. A duration for processing the streaming media segments during parallel coding by the coding servers may be determined based on the preset slicing granularity. A frame rate of a coding output may be determined based on the frame rate of the live streaming media source data. The overall code rate may be determined based on the respective independent code rates of the coding servers. When other parameters are fixed, a larger preset slicing granularity indicates a larger amount of data that needs to be processed during parallel coding by the coding servers, and a longer live streaming processing delay. A higher frame rate of the live streaming media source data indicates a larger amount of data that needs to be coded per unit time, and a longer corresponding coding time, i.e., a longer live streaming processing delay. Higher respective independent code rates of the coding servers indicate a higher overall code rate of the plurality of coding servers, and a shorter time required for processing the same amount of data, i.e., a shorter live streaming processing delay.

Specifically, the server may obtain the preset slicing granularity configured for processing the live streaming media source data, which may be flexibly configured based on an actual requirement. A larger preset slicing granularity indicates a longer duration of the streaming media segment obtained through slicing. The server determines the frame rate of the live streaming media source data, and the independent code rate of the coding server, and calculates the live streaming processing delay based on the preset slicing granularity, the frame rate, and the independent code rate. In a specific implementation, the live streaming processing delay may be calculated by using a formula of the live streaming processing delay=the preset slicing granularity*the frame rate/the independent code rate. The live streaming processing delay is positively correlated with the preset slicing granularity and the frame rate of the live streaming media source data, and the live streaming processing delay is negatively correlated with the independent code rate of the coding server. To be specific, when the frame rate of the live streaming media source data is certain, the live streaming processing delay may be reduced by increasing the independent code rate of the coding server or reducing the preset slicing granularity. The server determines the target caching duration based on the live streaming processing delay, so that the target caching duration is not less than the live streaming processing delay, thereby ensuring that the cached live streaming media source data can cover the live streaming processing delay and preventing stuttering during live streaming video playing. For example, when the live streaming processing delay is 12 seconds, the target caching duration set by the server may be greater than or equal to 12 seconds.

The server may determine the live streaming processing delay based on the preset slicing granularity, the frame rate of the live streaming media source data, and the independent code rate of the coding server, and determines the target caching duration based on the live streaming processing delay, so that the target caching duration is not less than the live streaming processing delay. In this way, it can be ensured that the cached live streaming media source data can cover the live streaming processing delay, stuttering during live streaming video playing can be prevented, a delay of transmission of the streaming media data during live streaming can be reduced, thereby ensuring live streaming.

The merging the respective coded video data of the coding servers to obtain coded live streaming media data may include: merging the respective coded video data of the coding servers based on a timestamp sequence, to obtain merged coded data; and performing encapsulation format conversion on the merged coded data, to obtain coded live streaming media data that is consistent with a live streaming transmission encapsulation format.

The timestamp sequence is a sequence of generation times of the coded live streaming media data corresponding to the coded video data. The merged coded data is merged data obtained by merging the coded video data. The live streaming transmission encapsulation format is an encapsulation format for transmission of the live streaming media. For example, the encapsulation format may be HTTP live streaming (HLS) and dynamic adaptive streaming over HTTP (DASH). HLS is a dynamic adaptive bitrate technology, and an HLS file includes an M3U8 index file, a TS media part file, and a key encrypted string file. DASH is HTTP-based dynamic adaptive streaming. Similar to the HLS protocol, DASH enables high-quality streaming media to perform transmission through the HTTP protocol by using an adaptive bitrate streaming technology.

Specifically, the server may determine the timestamp sequence of the respective coded video data of the coding servers, and merge the coded video data in sequence based on the timestamp sequence, to obtain merged coded data. The server performs encapsulation format conversion on the merged coded data, to obtain the coded live streaming media data that is consistent with the live streaming transmission encapsulation format. The coded live streaming media data is consistent with the live streaming transmission encapsulation format, so that the coded live streaming media data can be effectively transmitted to the live streaming client for playing.

Further, the live streaming media data processing method further includes: transmitting the coded live streaming media data to a live streaming client through a content delivery network (CDN) to be played on the live streaming client.

The CDN is a new network content service system, which is constructed based on the Internet Protocol (IP) network and provides content distribution and services based on efficiency requirements, quality requirements, and a content order of content access and application. The CDN represents a high-quality and efficient network application service mode with a distinct network order that is constructed based on the network. Specifically, the server transmits the coded live streaming media data to the live streaming client through the CDN, to play the coded live streaming data in real time on the live streaming client.

The server may perform encapsulation format conversion on the merged coded data, to obtain the coded live streaming media data that is consistent with the live streaming transmission encapsulation format, and transmits the coded live streaming media data to the live streaming client through the CDN for playing, which may ensure real-time playing of the live streaming media.

The live streaming media data processing method may further include: determining a maximum overall code rate of at least two coding servers; and adjusting a quantity of the at least two coding servers when it is determined that the maximum overall code rate does not match a numerical value of the frame rate of the live streaming media source data, so that the maximum overall code rate of the coding servers after adjustment matches the numerical value of the frame rate of the live streaming media source data.

The maximum overall code rate refers to a maximum code rate that the at least two coding servers can achieve during parallel coding. The maximum overall code rate is related to computing performance of the coding servers, and is also related to resource occupation states of the coding servers. To be specific, the maximum overall code rate may be a real-time overall code rate of the at least two coding servers. The coding servers in different resource occupation states may correspond to different maximum overall code rates.

Specifically, the server may determine the maximum overall code rate of the at least two coding servers, which may be specifically determined based on the independent code rates of the coding servers, and may also determine the maximum overall code rate based on the resource occupancy states of the coding servers. The server compares the maximum overall code rate with the frame rate of the live streaming media source data. If it is determined that the maximum overall code rate does not match the frame rate of the live streaming media source data, for example, if it is determined that a numerical value of the maximum overall code rate is less than the numerical value of the frame rate of the live streaming media source data, the server may adjust the quantity of coding servers, for example, may increase the quantity of coding servers, so that the maximum overall code rate of the coding servers after adjustment matches the frame rate of the live streaming media source data. In this way, real-time processing on the live streaming media source data can be implemented. In a specific application, if the server determines that the maximum overall code rate is less than the frame rate of the live streaming media source data, the server may increase the quantity of coding servers to increase the maximum overall code rate, thereby ensuring live streaming. If the maximum overall code rate is greater than the frame rate of the live streaming media source data, the server may decrease the quantity of coding servers, to reduce the maximum overall code rate and save operation resources.

When the maximum overall code rate of the at least two coding servers does not match the frame rate of the live streaming media source data, the server may enable the maximum overall code rate to match the frame rate of the live streaming media source data by adjusting the quantity of coding servers. In this way, the live streaming can be ensured, and the operation resources can be saved.

The at least two coding servers may respectively perform, by using coding operations, parallel coding on the streaming media segments obtained through the slicing. The coding operations include: dividing video frames of the streaming media segments to obtain respective coding units (CUs) of the video frames; predicting the respective CUs of the video frames, and obtaining residual data of the CUs based on obtained predicted values; and coding the respective residual data of the video frames, to obtain coded video data of the streaming media segments.

During parallel coding on the streaming media segments obtained through the slicing by using at least two coding servers, the coding servers respectively perform coding on the respective streaming media segments through the coding operations. The CU is a basic unit that performs predictive coding. The residual data may be obtained based on a difference between the CU and a corresponding predicted value thereof.

Specifically, the coding server may partition the video frames in the streaming media segments to obtain the respective CUs of the video frames. Each video frame in the streaming media segment may be partitioned into a plurality of CUs. The coding server predicts the respective CUs of the video frames, and may specifically perform prediction based on prediction units (PUs) in the CUs, to obtain the predicted values corresponding to the CUs. The coding server obtains residual data of the CUs based on the obtained predicted values. Specifically, the coding server may determine the difference between the CU and the corresponding predicted value thereof, and obtain the residual data based on the difference. The coding server may code the respective residual data of the video frames, to obtain the coded video data of the streaming media segments.

The coding server may partition the video frames in the streaming media segments into the CUs, and determines the residual data of the CUs based on the predicted values obtained by predicting the CUs. The residual data is coded to obtain the coded video data of the streaming media segments. In this way, coding is performed based on the difference between the video frames to implement compression of the video frames, thereby reducing a data volume of the coded video data.

The CU may include the PU. The predicting the respective CUs of the video frames, and obtaining residual data of the CUs based on obtained predicted values includes: predicting the respective PUs of the video frames based on a target prediction mode, to obtain predicted data, the target prediction mode being determined from intra-frame prediction and inter-frame prediction; determining original residuals of the CUs based on the predicted data predicted by the PU and the PU; and performing data transformation on the original residuals of the CUs, to obtain the residual data of the CUs.

The CU includes the PU. The PU specifies all prediction modes of the CU. Prediction-related information is defined in the PU. Specifically, for example, a direction of the intra-frame prediction, a segmentation manner of the inter-frame prediction, motion vector prediction, and a reference image index number for inter-frame prediction all fall within a category of the PU. The target prediction mode is a prediction manner in which the PU performs prediction, and the target prediction mode is determined from the intra-frame prediction and the inter-frame prediction. The intra-frame prediction is a prediction mode in which a current coding block is predicted by using surrounding reconstructed pixel values through a spatial correlation of an image. The inter-frame prediction is a prediction mode in which temporal redundancy of video information is eliminated through coding methods of motion estimation (ME) and motion compensation (MC) by using a correlation between consecutive images, to perform prediction by using a previously coded reconstructed frame as a reference frame. The predicted data is a prediction result obtained by predicting the PU. The original residual is an original difference between the predicted data and the PU. Through data transformation on the original residual, for example, discrete cosine transform (DCT) and quantization processing, the residual data is obtained.

Specifically, the coding server determines the PU in the CU, and predicts the respective PUs of the video frames based on the target prediction mode to obtain the predicted data. Specifically, the PU may be predicted based on the intra-frame prediction or the inter-frame prediction, to obtain the predicted data. The coding server may determine the original residuals of the CUs based on the predicted data and the PU. For example, the coding server may determine the difference between the predicted data and the PU, and obtain the original residuals of the CUs based on the difference. The coding server performs data transformation on the original residuals of the CUs, for example, performs DCT and quantization processing, to obtain the residual data of the CUs. Coding is performed based on the residual data to obtain the coded video data of the streaming media segments, thereby implementing coding of the streaming media segments.

The coding server may perform prediction based on the intra-frame prediction or the inter-frame prediction through the PU in the CU, and determines the original residuals of the CUs based on the obtained predicted data and the PUs. The coding server performs data transformation on the original residuals of the CUs, to obtain the residual data of the CUs, so that coding may be performed based on the residual data of the CUs to implement compression on the video frames, thereby reducing the data volume of the coded video data.

This application further provides an application scenario. The foregoing live streaming media data processing method is applied to the application scenario. Specifically, application of the live streaming media data processing method in the application scenario is as follows:

A live streamer performs live video streaming through a terminal. The terminal transmits collected live streaming media source data to a live streaming server. The live streaming server caches the live streaming media source data, and slices the cached live streaming media source data based on a preset slicing granularity in response to a streaming media duration of the cached live streaming media source data reaching a target caching duration, to obtain a plurality of independently codable streaming media segments. The target caching duration is positively correlated with the preset slicing granularity. The live streaming server transmits the plurality of streaming media segments to a coding server cluster, to perform, by using at least two coding servers in the coding server cluster, parallel coding on the streaming media segments obtained through the slicing to obtain respective coded video data of the coding servers. An overall code rate of the at least two coding servers is not less than a frame rate of the live streaming media source data. The coding servers in the coding server cluster respectively transmit the respective coded video data obtained through coding to the live streaming server. The live streaming server merges the respective coded video data of the coding servers to obtain coded live streaming media data, and transmits the coded live streaming media data to a live streaming client to be played on the live streaming client.

This application further provides an application scenario. The foregoing live streaming media data processing method is applied to the application scenario. Specifically, application of the live streaming media data processing method in the application scenario is as follows:

Live streaming media data may include audio/video data during live streaming. A video is a main carrier for information presentation and dissemination. It is predicted that in the future, at least 80% of network traffic of an individual consumer and at least 70% of industry application traffic are all video data. Currently, a video technology is undergoing an evolution from high definition (HD) (1080 P) to ultra high definition (UHD). Picture resolutions of 4K UHD and 8K UHD are respectively 4 times and 16 times that of HD. The UHD video industry is a related economic activity focusing on collection, production, transmission, and presentation of UHD videos. The development of the UHD video industry is to effectively drive replacement and upgrading of terminal products and update of production and broadcast devices, drive development of industries such as upstream chips and panels, and promote broadband network investment and construction, commercial use of the $5^{th}$ generation mobile communication technology (5G) network, and service development. Based on the standards of the international telecommunication union (ITU), the UHD videos include two specifications: 4K and 8K, which support a total of 9 frame rates: 23.976 fps, 24 fps, 25 fps, 29.97 fps, 30 fps, 50 fps, 59.94 fps, 60 fps, and 120 fps. Real-time coding of UHD videos (4K/8K/16K) is always a pain point in the industry. Resolution pixels of 4K and 8K UHD videos are respectively 4 times and 16 times that of 1080 P, and the 4K/8K FPS is substantially 60 FPS+, therefore resulting in coding computing power that is dozens of times relative to 1080 P. Currently, in the video industry, 1080 P is commonly used, and only a small number of long videos support 4K video sources. However, all of the videos adopt offline long video coding. In the live streaming industry, 4K/8K live streaming is hardly seen, and is occasionally implemented through specialized coding devices. However, specialized 8K coding devices in 8K channels cost a lot. Computing power requirements for real-time coding of the UHD videos and high costs of professional devices hinder the development of the UHD live streaming industry.

Based on this, according to an illustrative live streaming media data processing method, high-FPS (>=60) coding may be performed for live streaming UHD 4K/8K/16K videos by using a distributed general-purpose cloud virtual machine (CVM) architecture, to realize low-cost high-quality coding for live streaming UHD videos, which facilitates promotion of industry development, and has a good application prospect in the closed circuit television (CCTV) and over the top (OTT) industries.

Figure 4:
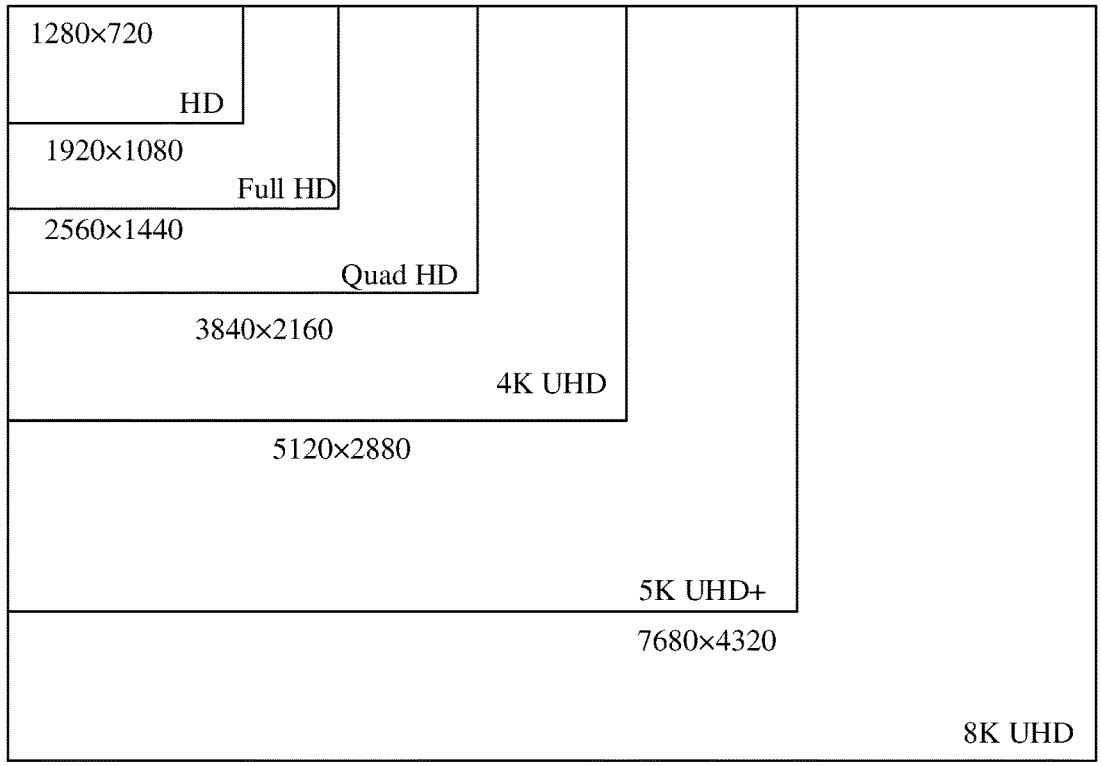
FIG. 4 is a schematic diagram of video resolution comparison according to one or more illustrative aspects described herein.

Specifically, regarding the definition of the UHD video by the ITU, the definition of the UHD video comes from video picture resolutions of 4K and above. However, merely increasing the resolution cannot fully reflect improvement of visual effects. It is necessary to simultaneously break through technologies in six dimensions of high resolution, high frame rate, high color depth, wide color gamut, high dynamic range, and three-dimensional sound, to bring a subversive, more infectious, and immersive presence experience. As shown in FIG. 4, during comparison of video resolutions, the video resolution of HD is 1280*720 pixels, the video resolution of full HD is 1920*1080 pixels, the video resolution of quad HD is 256*1440 pixels, the video resolution of 4K UHD is 3840*2160 pixels, the video resolution of 5K UHD+ is 5120*2880 pixels, and the video resolution of 8K UHD is 7680*4320 pixels. Based on the reference standards of the ITU, the UHD video includes two specifications: 4K and 8K. 4K refers to 4K UHD (UHD4K) with a horizontal resolution of 3840, a vertical resolution of 2160, an aspect ratio of 16:9, and a total quantity of pixels of about 8.3 million. 8K refers to 8K UHD (UHD8K) with a horizontal resolution of 7680, a vertical resolution of 4320, an aspect ratio of 16:9, and a total quantity of pixels of about 33.2 million. In addition, 16K UHD (15360×8640, 130 million pixels) is also applied and explored in some metaverse virtual reality (VR) scenarios, and the latest video coding standards AV2 and VVC may also support 16K coding. In the ITU specification, the UHD video supports a total of 9 frame rates: 23.976 fps, 24 fps, 25 fps, 29.97 fps, 30 fps, 50 fps, 59.94 fps, 60 fps, and 120 fps. With the huge improvement in the network bandwidth and the coding computing power, an interlaced-scan field coding manner has been removed from the ITU standard, and only a progressive-scan frame coding manner is retained. In terms of color depth, the ITU increases original 8 bits to 10 bits and 12 bits. The specification of 10 bits is used for 4K UHD, and the specification of 12 bits is used for 8K UHD. The foregoing improvements further improve fluency, an exquisite feeling, and color gradation of the UHD video.

Figure 5:
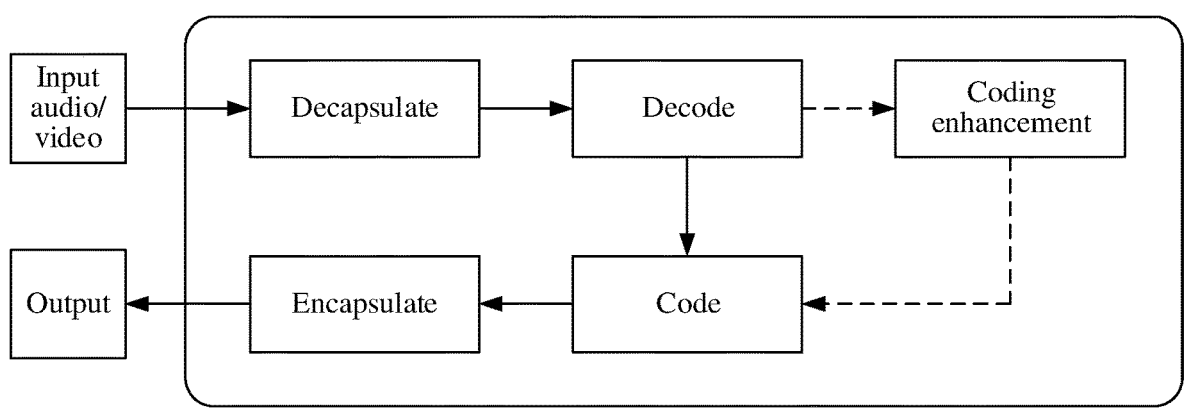
FIG. 5 is a schematic flowchart of audio/video processing according one or more illustrative aspects described herein.

Further, as shown in FIG. 5, in a process of processing audio/video, after the audio/video to be processed is inputted, the audio/video is decapsulated (libavformat demuxing), and the decapsulated coded data is decoded (libavcodec decoding). The decoded audio/video data may be coded (libavcodec encoding). The coding and decoding support various formats such as H.264/H.265/AV1/H.266. The coded audio/video data is encapsulated (libavcodec muxing) and then outputted, which may be specifically encapsulated into various encapsulation formats such as Mp4/MOV/T5. In addition, coding enhancement (libavfilter apply effects) may also be performed on the decoded audio/video data, and the audio/video data after the coding enhancement is successively coded and encapsulated, to obtain the outputted coded audio/video data. The coding enhancement may specifically include various processes such as super resolution/frame insertion, standard dynamic range (SDR)/high dynamic range (HDR), text watermarking, denoising/deburring, debouncing, color enhancement, subtitle adding, splicing, and CSS sprites. Computing power of audio/video processing is mainly embodied in a coding stage. Pixels of resolutions of 4K and 8K UHD videos are respectively 4 times and 16 times those of 1080 P, and the 4K/8K FPS is substantially a high refresh rate of 60FPS+, therefore resulting in a requirement for coding computing power that is dozens of times relative to 1080 P. H.265/H.266/AV1 supports 4K/8K coding, and the latest video coding standard H.266/AV2 supports 16K coding. Real-time coding of 4K/8K UHD videos is always a pain point in the industry.

Further, for video coding, H.265 is used as an example. A frame of an image is transmitted to a coder and partitioned into coding tree units (CTU) based on a block size of 64×64, and then CUs are obtained through depth partitioning. Each of the CUs includes a PU and a transform unit (TU). Each PU is predicted to obtain a predicted value. The predicted value is subtracted from inputted image data to obtain a residual, then DCT and quantization are performed to obtain a residual coefficient, and the residual coefficient is transmitted to an entropy coding module to output a bit stream. In addition, inverse quantization and inverse transformation are performed on the residual coefficient to obtain a residual value of a reconstructed image, and the residual value and the predicted value are added together to obtain the reconstructed image. The reconstructed image enters a reference frame queue after in-loop filtering, and is used as a next frame of a reference image. In this way, coding backward is performed successively. During prediction, starting from a largest CU (LCU), partitioning is performed at each layer based on a quadtree, and is continued layer by layer in a downward direction, and recursive computation is performed. First, partitioning is performed from top to bottom. A 64×64 block is first partitioned into four 32×32 sub-CUs starting from depth=0. Then one of the 32×32 sub-CUs continues to be partitioned into four 16×16 sub-CUs, and so on, until depth=3 and a size of the CU is 8×8. Then trimming is performed from bottom to top. Values of RDcost (denoted as cost1) of four 8×8 CUs are summed, and the sum is compared with those of RDcost (denoted as cost2) of the 16×16 CU at a corresponding previous level. If cost1 is less than cost2, partitioning of the 8×8 CUs is retained. Otherwise, trimming upward is continued, and comparison is performed layer by layer. Finally, an optimal depth partitioning case of the CUs is found. PU prediction is divided into intra-frame prediction and inter-frame prediction. First, in the same prediction type, different PUs are compared to find an optimal partitioning mode, and then the optimal partitioning mode is compared with intra- and inter-frame modes to find an optimal prediction mode for a current CU. In addition, adaptive transform (Residual Quad-Tree Transform, RQT) based on the quadtree is performed on the CUs to find an optimal TU mode. Finally, the frame of the image is partitioned into CUs, and PUs and TUs corresponding to the CUs, to perform prediction through the PUs. In addition, a frame of a video image may also be coded into one or more slices. Each slice includes an integer quantity of macroblocks. To be specific, each slice includes at least one macroblock, and includes macroblocks of the entire image at most. The slice is intended to limit spread and transmission of an error code, so that the coding slices remain independent of each other. A macroblock is a basic unit for coding. A coding image first needs to be partitioned into a plurality of blocks before processing. The macroblock is composed of an integer quantity of blocks.

Figure 6:
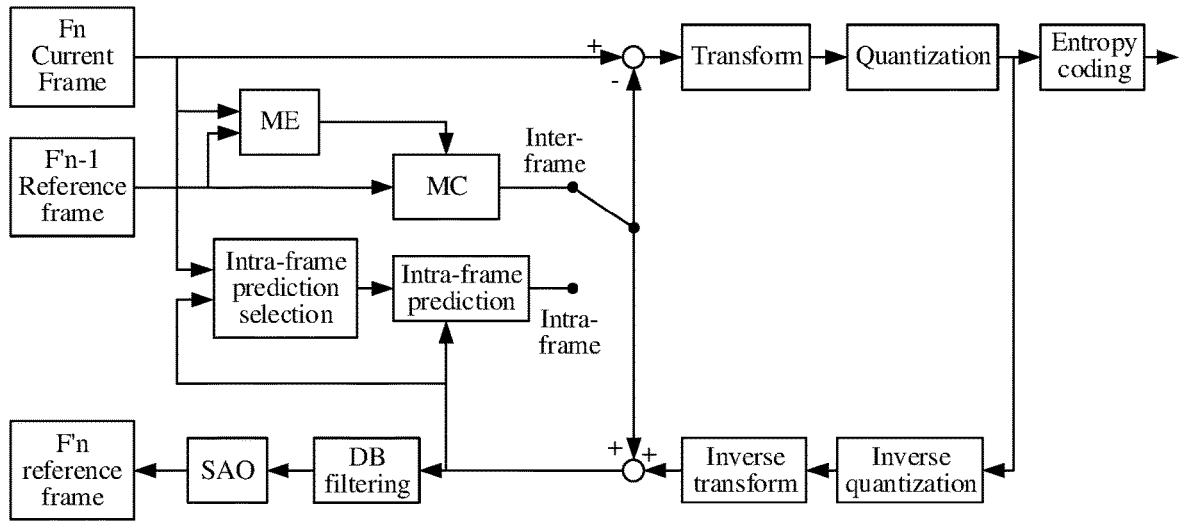
FIG. 6 is a schematic flowchart of video coding processing according one or more illustrative aspects described herein.

As shown in FIG. 6, when a current frame Fn is inputted for coding, prediction is performed based on the current frame Fn to obtain a predicted value, and the predicted value is subtracted from the current frame Fn to obtain a residual. Transformation and quantization are successively performed on the residual to obtain a residual coefficient, and entropy coding is performed on the residual coefficient to obtain a coding result of the current frame Fn. In addition, inverse quantization and inverse transformation are performed on the residual coefficient to obtain a residual value of a reconstructed image, and the residual value of the reconstructed image and the predicted value of the current frame Fn are added together to obtain the reconstructed image. After deblocking (DB) filtering and sample adaptive offset (SAO) filtering are performed on the reconstructed image, a reference frame F'n is obtained. The reference frame F'n serves as a next frame of a reference image. Further, during specific prediction, when inter-frame prediction is performed on the current frame Fn, ME and MC are performed based on a reference frame F'n−1, to obtain an inter-frame prediction result. During intra-frame prediction, intra-frame prediction selection is performed based on the current frame Fn, to implement intra-frame prediction and obtain an intra-frame prediction result. A predicted value of the current frame Fn is obtained through comparison of the inter-frame prediction result with the intra-frame prediction result.

Figure 7:
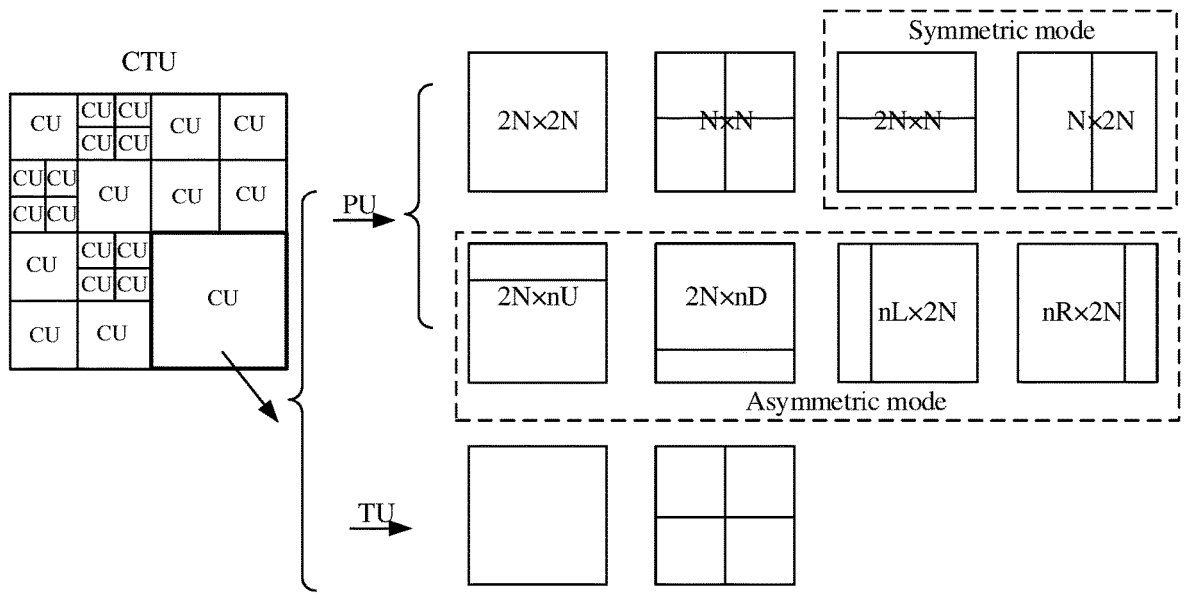
FIG. 7 is a schematic diagram of partitioning of a coding tree unit (CTU) according to one or more illustrative aspects described herein.

Further, there are 8 partitioning modes for a PU, and 2 partitioning modes for a TU, i.e., to partition and not to partition. H.265 still uses the widely accepted hybrid coding framework (which includes four coding parts: intra-frame coding, inter-frame coding, transformation, and quantization) that has been used since H.263, for example, intra-frame prediction and inter-frame prediction based on MC, transformation coding, and high-performance entropy coding. Compared with the previous coding standard, H.265 adopts a large quantity of innovative technologies, for example, a flexible partitioning structure and a residual coding structure based on a large-sized quadtree, adaptive motion parameter coding, and adaptive in-loop filtering. The new technologies improve the coding efficiency of H.265. The CU is the most basic square CU. A size of the CU may range from 8*8 to 64*64 of the LCU. The PU is a basic unit for the intra-frame prediction and the inter-frame prediction, and a size thereof may range from 4×4 to 64×64. In addition to the partitioning methods of symmetric modes (symmetric motion partition, SMP) such as 2N×2N, N×N, 2N×N, and N×2N similar to H.264, H.265 further provides asymmetric modes (asymmetric motion partition, AMP), including 2N×nU, 2N×nD, nL×2N, and nR×2N. The uppercase English letters represent positions of partitioning blocks having relatively small side lengths. The TU is a basic unit for the transformation and quantization process. A shape of the TU depends on the partitioning mode of the PU. When the PU is a square, the TU is also a square with a size in a range of 4×4 to 32×32. When the PU is not a square, the TU is not a square either, and a size thereof is 32×8, 8×32, 16×4, or 4×16. Each CU includes one or more TUs, but partitioning of the TU needs to be performed within the quadtree of the CU. As shown in FIG. 7, CUs are obtained through depth partitioning of the CTU. The CU includes a PU and a TU. Partitioning modes of the PU include 2N×2N, N×N, 2N×N, N×2N, 2N×nU, 2N×Nd, nL×2N, and nR×2N, and the like. Partitioning modes for the TU are to partition and not to partition.

H.265 uses HM16.8 as an example to code a 1080 P sequence. 0.03 frames per second are coded in a 2M bandwidth. If a 10-minute video with a frame rate of 30 fps is coded at this speed, 10*30/0.03=10000 minutes, about 166.67 hours are needed. This coding speed cannot be applied to engineering products. On the one hand, a coder needs to perform engineering performance acceleration, such as multithreading and assembly instruction acceleration, and on the other hand, the coder may also crop video standard algorithms. For example, in the H.265 coding process, cropping and skipping are performed on partitioning of CUs, PUs, and TUs, and intra-frame and inter-frame prediction for different video scenarios. Finally, a specific loss may occur in a performance parameter bd-rate of a video coding algorithm. However, some compromises may be made between engineering performance and a compression rate, to implement coding of UHD videos on a general-purpose server.

Figure 8:
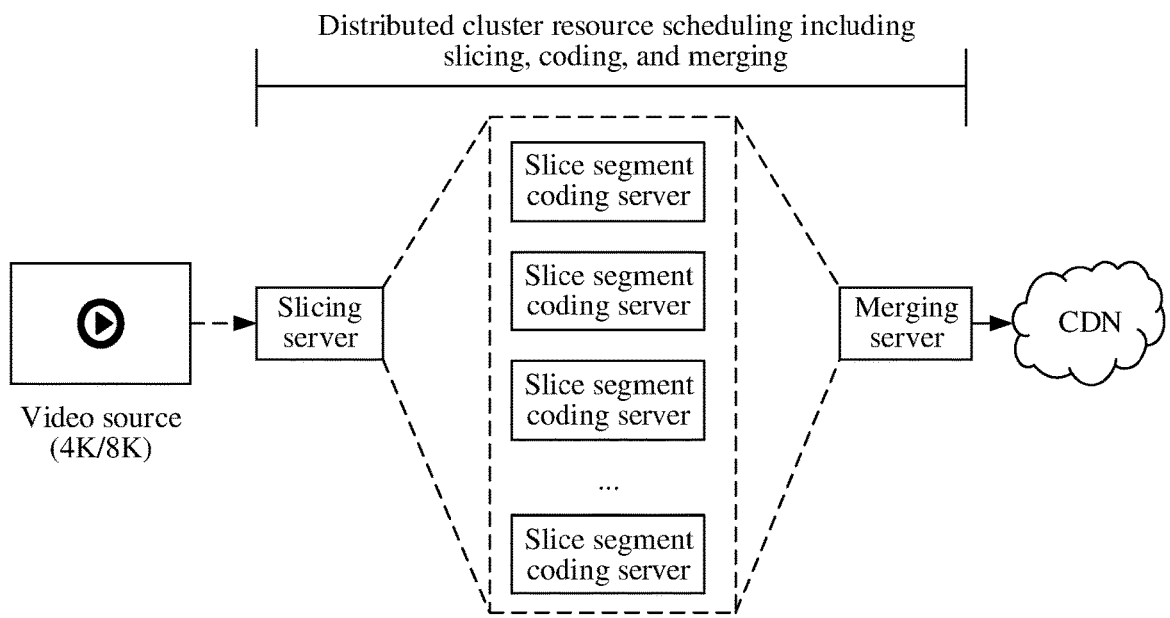
FIG. 8 is a schematic flowchart of a live streaming media data processing method according to one or more illustrative aspects described herein.

Specifically, according to an illustrative live streaming media data processing method, as shown in FIG. 8, live streaming media data is generally processed through distributed cluster scheduling including slicing, coding, and merging, in which module servers are scheduled and allocated for processing based on cluster load scheduling. Specifically, a video source is a 4K/8K UHD video, which may specifically include a video in a format such as MP4/MOV/TS/MKV. A slicing server slices a UHD video source based on a multiple of a granularity of a GOP. A length of the GOP is a video frame between two instantaneous decoder refresh (IDR) frames, and information of a sequence parameter set (SPS) and a picture parameter set (PPS) of the video frame is independent. Slicing is performed based on the multiple of the granularity of the GOP, and an obtained video may be played normally. If slicing is not performed based on the multiple of the granularity of the GOP, random video slicing and decoding may cause a problem of a blurred screen and the like. The SPS has a set of global parameters of a coded video sequence stored therein. The so-called coded video sequence is a sequence composed of structures of coded frame-by-frame pixel data of an original video. Parameters on which the coded data of each frame depends are stored in the PPS. Generally, NAL units of the SPS and the PPS are usually located at a start position of an entire bit stream. However, in some special cases, the two structures may also appear in the middle of the bit stream, and a main reason may be that a decoder needs to start decoding in the middle of the bit stream and a coder changes parameters of the bit stream during coding. The PPS stores some coding-related parameters such as an entropy coding type, a quantity of slices, whether to perform weight prediction, and quantization and filtering parameters in a current video segment of the NAL unit.

In a video coding algorithm such as H.264/H.265/H.266/AV1, images are organized in a sequence. A first image in a sequence is referred to as an IDR image. The IDR images are all I frame images. An IDR image causes a decoded picture buffer (DPB) to be emptied, while an I frame does not. The DPB is the decoded picture buffer. During video decoding, several most recent reference frames need to be cached, and this buffer is referred to as the DPB. Decoded images are cached in the DPB and used as reference images for subsequent frames. Therefore, the decoder needs to manage the images in the DPB according to a specific rule. The IDR images are definitely I frame images, but the I frame images are not necessarily IDR images. A large quantity of I frame images may exist in a sequence, and images after the I frame images may use an image between the I frame images as motion reference. A P frame is a forward predictive coding frame. The P frame represents a difference between a current frame and a previous key frame (or the P frame), and a difference defined in the current frame needs to be superimposed with a previously cached picture during decoding to generate a final picture. A B frame is a bidirectional predictive interpolation coding frame. The B frame is a bidirectional difference frame. In other words, the B frame records a difference between the current frame and previous and forward frames. The B frame may be used as a reference frame for other B frames, or may not be used as the reference frame for other B frames. The GOP is an interval between two I frames.

The slicing server re-encapsulates slices into video segments in a TS format. Real-time parallel coding is performed on the generated sliced video segments through a plurality of slice segment coding servers. Since a source is sliced into TS video segments, a plurality of slice segment coding servers are needed to perform parallel coding. Assuming that an FPS of the source video is F, a length of the slice is 1 second, and a minimum coding speed of the slice segment coding server is X FPS, a total live streaming delay D>=F/X. To be specific, before starting slicing, a video buffer with a length of >=D needs to be accumulated before coding, to ensure that a total FPS of a subsequent coding cluster is >=the original FPS of the video, so that no stuttering is generated.

Figure 9:
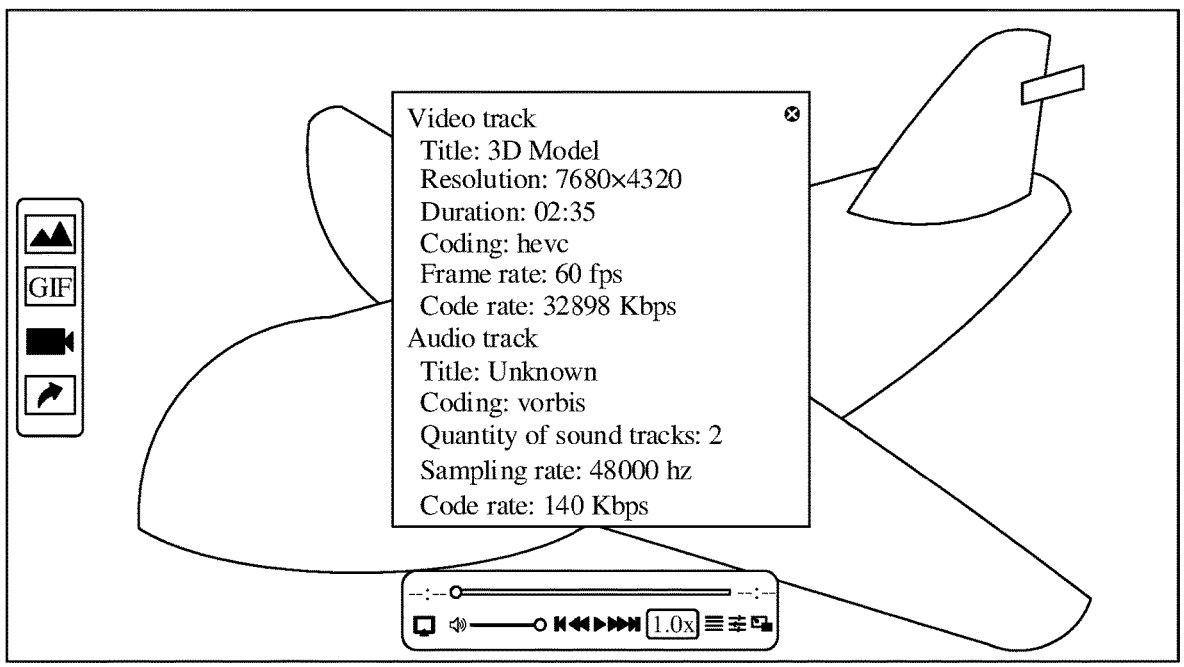
FIG. 9 is a schematic diagram of an interface for ultra high definition video live streaming according to one or more illustrative aspects described herein.

Further, a merging server re-encapsulates the TS video segments generated from the parallel sliced video coding in an HLS/DASH encapsulation format. HLS/DASH live streaming video contents are transmitted in a container format of encapsulated TS parts, to facilitate parallel independent coding and outputting by the slice segment coding servers. In a case of contents that are encapsulated into one video stream container format, such as RTMP/FLV/WebRTC contents, problems with container format code compatibility may occur during final merging into a signal stream for outputting. In addition, if a compatibility requirement is satisfied, in addition to HLS/DASH, the video contents may also be re-encapsulated in various encapsulation formats such as RTMP/FLV/WebRTC. Finally, the CDN distributes the re-encapsulated HLS/DASH UHD video format for live streaming to users for watching. A basic idea of the CDN is to avoid bottlenecks and links on the Internet as far as possible that may possibly affect a data transmission speed and stability, to achieve faster and more stable content transmission. Through an intelligent virtual network layer based on the existing Internet formed by placing node servers everywhere in the network, a CDN system can redirect a user request to a service node closest to the user based on comprehensive information such as a network traffic, connection and load conditions of each node, a distance to the user, and a response time in real time. The purpose is to enable the user to obtain required content nearby, alleviate a condition of network congestion, and increase the response speed of visiting a website by the user. In a specific application, as shown in FIG. 9, during real-time coding and live streaming of an 8K video, real-time 8K video coding may be stably performed at 60 FPS.

Although the operations in the illustrative flowcharts are displayed in sequence as indicated by arrows, these operations are not necessarily performed in sequence as indicated by the arrows. Unless otherwise explicitly specified in this application, execution of the operations is not strictly limited, and the operations may be performed in another sequence. Moreover, at least some of the operations in the illustrative flowcharts may include a plurality of operations or a plurality of stages. The operations or stages are not necessarily performed at the same moment but may be performed at different moments. These operations or stages are not necessarily successively performed, but may be performed alternately with other operations or at least part of operations of other operations or stages.

Based on the same inventive concept, aspects may further provide a live streaming media data processing system for implementing the foregoing live streaming media data processing method. An implementation solution to the problem provided by the system is similar to the implementation described in the foregoing method. Therefore, for specific limitations in one or more live streaming media data processing systems provided below, reference may be made to the limitations on the live streaming media data processing method in the above. Details are not described herein again.

Figure 10:
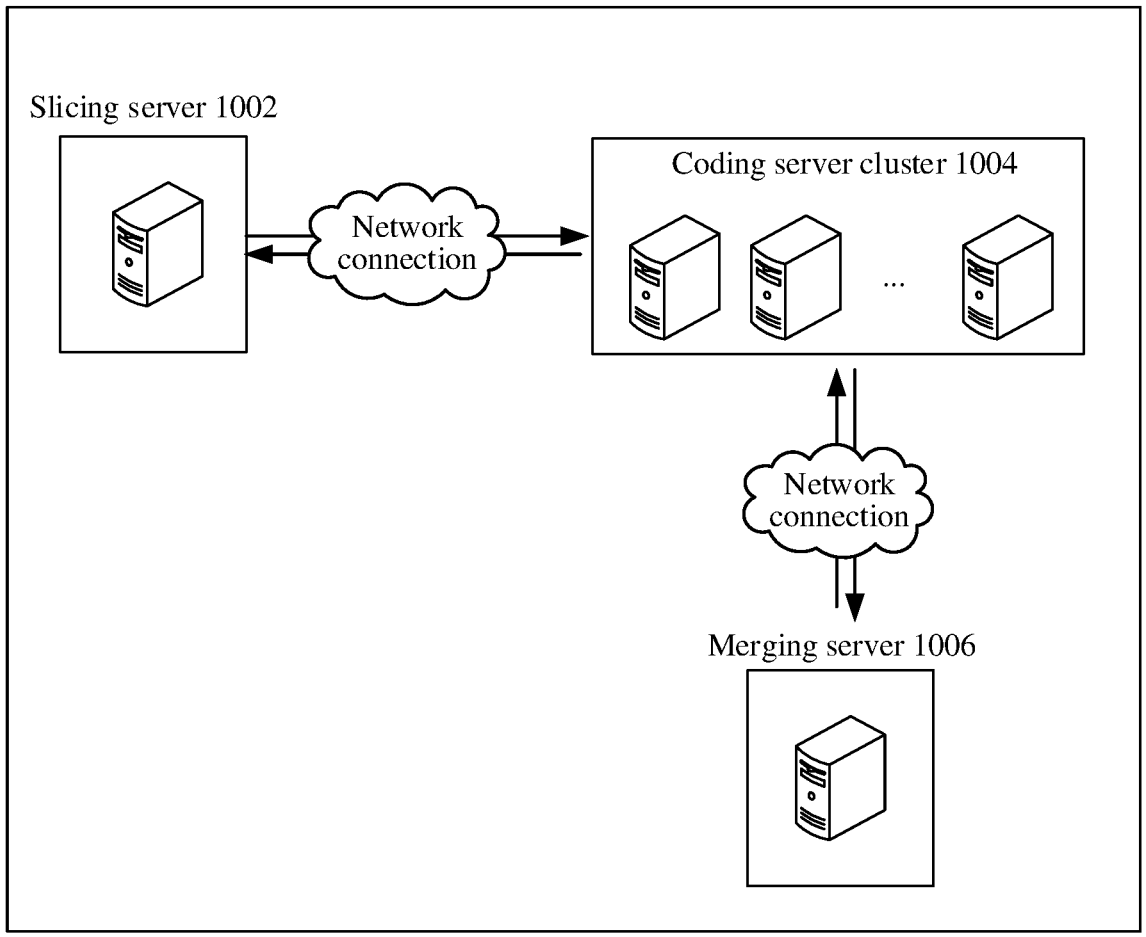
FIG. 10 is a structural block diagram of a live streaming media data processing system according to one or more illustrative aspects described herein.

As shown in FIG. 10, a live streaming media data processing system 1000 is provided. The system may include: a slicing server 1002, a merging server 1006, and a coding server cluster 1004 including at least two coding servers.

The slicing server 1002 is configured to cache live streaming media source data, and slice the cached live streaming media data based on a preset slicing granularity in response to a streaming media duration of the cached live streaming media source data reaching a target caching duration, to obtain a plurality of independently codable streaming media segments, a numerical value of the target caching duration being greater than a numerical value of the preset slicing granularity.

The coding server cluster 1004 is configured to perform, by using at least two coding servers, parallel coding on the streaming media segments obtained through the slicing, to obtain respective coded video data of the coding servers.

The merging server 1006 is configured to merge the respective coded video data of the coding servers to obtain coded live streaming media data, the coded live streaming media data being configured for transmission to a live streaming client.

The preset slicing granularity may include an integer multiple of a granularity of a preset GOP. The slicing server 1002 is further configured to: collect statistics about the streaming media duration of the cached live streaming media source data; and slice, when the streaming media duration reaches a preset target caching duration, the cached live streaming media source data based on the integer multiple of the granularity of the preset GOPs, to obtain the plurality of independently codable streaming media segments.

A target quantity of streaming media segments may be provided. The coding server cluster 1004 is further configured to perform, by using at least the target quantity of coding servers, parallel coding on the streaming media segments obtained through the slicing, to obtain respective coded video data of the coding servers, an overall code rate of the at least the target quantity of coding servers being not less than a frame rate of the live streaming media source data.

Based on the same inventive concept, there may be a live streaming media data processing apparatus for implementing the foregoing live streaming media data processing method. An implementation solution to the problem provided by the apparatus is similar to the implementation described in the foregoing method. Therefore, for specific features in one or more live streaming media data processing apparatus provided below, reference may be made to the features of the live streaming media data processing method in the above. Details are not described herein again.

Figure 11:
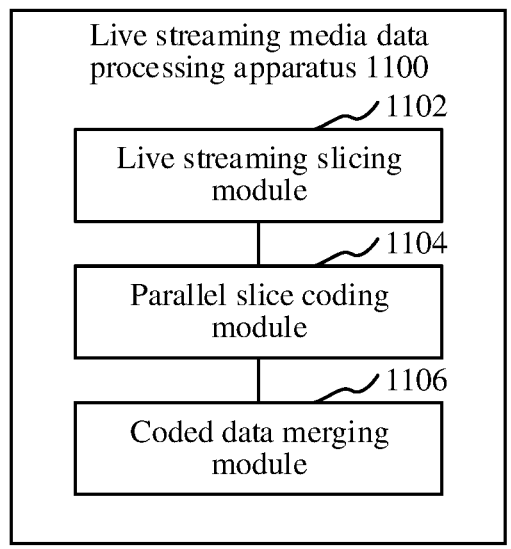
FIG. 11 is a structural block diagram of a live streaming media data processing apparatus according to one or more illustrative aspects described herein.

As shown in FIG. 11, a live streaming media data processing apparatus 1100 is provided, which may include a live streaming slicing module 1102, a parallel slice coding module 1104, and a coded data merging module 1106.

The live streaming slicing module 1102 is configured to cache live streaming media source data, and slice the cached live streaming media source data based on a preset slicing granularity in response to a streaming media duration of the cached live streaming media source data reaching a target caching duration, to obtain a plurality of independently codable streaming media segments, a numerical value of the target caching duration being greater than a numerical value of the preset slicing granularity.

The parallel slice coding module 1104 is configured to perform, by using at least two coding servers, parallel coding on the streaming media segments obtained through the slicing, to obtain respective coded video data of the coding servers, an overall code rate of the at least two coding servers being not less than a frame rate of the live streaming media source data.

The coded data merging module 1106 is configured to merge the respective coded video data of the coding servers, to obtain coded live streaming media data, the coded live streaming media data being configured for transmission to a live streaming client.

The preset slicing granularity may include an integer multiple of a granularity of a preset GOP. The live streaming slicing module 1102 includes a cache statistics module and a cache slicing module. The cache statistics module is configured to collect statistics about the streaming media duration of the cached live streaming media source data. The cache slicing module is configured to slice, when the streaming media duration reaches a preset target caching duration, the cached live streaming media source data based on the integer multiple of the granularity of the preset GOPs, to obtain the plurality of independently codable streaming media segments.

The cache slicing module may include an equal granularity slicing module and a slice encapsulation module. The equal granularity slicing module is configured to slice the cached live streaming media source data at an equal granularity based on the integer multiple of the granularity of the preset GOP, to obtain a plurality of pieces of independently codable live streaming media slice data with the same duration. The slice encapsulation module is configured to respectively encapsulate the plurality of pieces of live streaming media slice data based on a target encapsulation format, to obtain a plurality of streaming media segments in the target encapsulation format.

A target quantity of streaming media segments may be provided. The parallel slice coding module 1104 is further configured to perform, by using at least the target quantity of coding servers, parallel coding on the streaming media segments obtained through the slicing, to obtain respective coded video data of the coding servers, an overall code rate of the at least the target quantity of coding servers being not less than a frame rate of the live streaming media source data.

The plurality of streaming media segments may be in a target encapsulation format. The parallel slice coding module 1104 includes a data restoration module, a coding module, and a coding encapsulation module. The data restoration module is configured to perform, by using the at least two coding servers, parallel decapsulation and coding on streaming media segments in the target encapsulation format that are obtained through the slicing, to obtain streaming media data. The coding module is configured to perform parallel coding on the respective streaming media data by using the coding servers, to obtain respective coded segments of the coding servers. The coding encapsulation module is configured to perform parallel encapsulation on the respective coded segments based on the target encapsulation format by using the coding servers, to obtain the respective coded video data of the coding servers.

The apparatus may further include a slicing granularity obtaining module, a live streaming delay determination module, and a caching duration determination module. The slicing granularity obtaining module is configured to obtain a preset slicing granularity configured for processing the live streaming media source data. The live streaming delay determination module is configured to determine a live streaming processing delay based on the preset slicing granularity, the frame rate of the live streaming media source data, and an independent code rate of the coding server. The caching duration determination module is configured to determine the target caching duration based on the live streaming processing delay, the target caching duration being not less than the live streaming processing delay.

The coded data merging module 1106 may be further configured to: merge the respective coded video data of the coding servers based on a timestamp sequence, to obtain merged coded data; and perform encapsulation format conversion on the merged coded data, to obtain coded live streaming media data that is consistent with a live streaming transmission encapsulation format. The apparatus further includes a data transmission module, configured to transmit the coded live streaming media data to the live streaming client through a CDN to be played on the live streaming client.

The apparatus may further include a server quantity adjustment module, configured to: determine a maximum overall code rate of the at least two coding servers; and adjust a quantity of the at least two coding servers when it is determined that the maximum overall code rate does not match a numerical value of the frame rate of the live streaming media source data, so that a maximum overall code rate of the coding servers after the adjustment matches the numerical value of the frame rate of the live streaming media source data.

The apparatus may further include a CU obtaining module, a prediction module, and a residual coding module. The CU obtaining module is configured to partition video frames of the streaming media segments to obtain respective CUs of the video frames. The prediction module is configured to predict the respective CUs of the video frames, and obtain residual data of the CUs based on obtained predicted values. The residual coding module is configured to code the respective residual data of the video frames, to obtain coded video data of the streaming media segments.

The CU may include a PU. The prediction module is further configured to: predict the respective PUs of the video frames based on a target prediction mode, to obtain predicted data, the target prediction mode being determined from intra-frame prediction and inter-frame prediction; determine original residuals of the CUs based on the predicted data predicted by the PU and the PU; and perform data transformation on the original residuals of the CUs, to obtain the residual data of the CUs.

All or some of the modules in the foregoing live streaming media data processing apparatus may be implemented by software, hardware, or a combination thereof. The foregoing modules may be built in or independent of a processor of a computer device in a form of hardware, or may be stored in a memory of the computer device in a form of software, so that the processor invokes each of the foregoing modules to perform an operation corresponding to the module.

A computer device may be provided. The computer device may be a server. An internal structure diagram of the server may be shown in FIG. 12. The computer device includes a processor, a memory, an input/output (I/O for short) interface, and a communication interface. The processor, the memory, and the I/O interface are connected through a system bus, and the communication interface is connected to the system bus through the I/O interface. The processor of the computer device is configured to provide computing and control capabilities. The memory of the computer device includes a non-volatile storage medium and an internal memory. The nonvolatile storage medium has an operating system, a computer-readable instruction, and a database stored therein. The internal memory provides an environment for running of the operating system and the computer-readable instruction in the non-volatile storage medium. The database of the computer device is configured to store live streaming media data. The I/O interface of the computer device is configured to exchange information between the processor and an external device. The communication interface of the computer device is configured to connect to and communicate with an external terminal through a network. The computer-readable instruction, when executed by the processor, implements a live streaming media data processing method.

Figure 12:
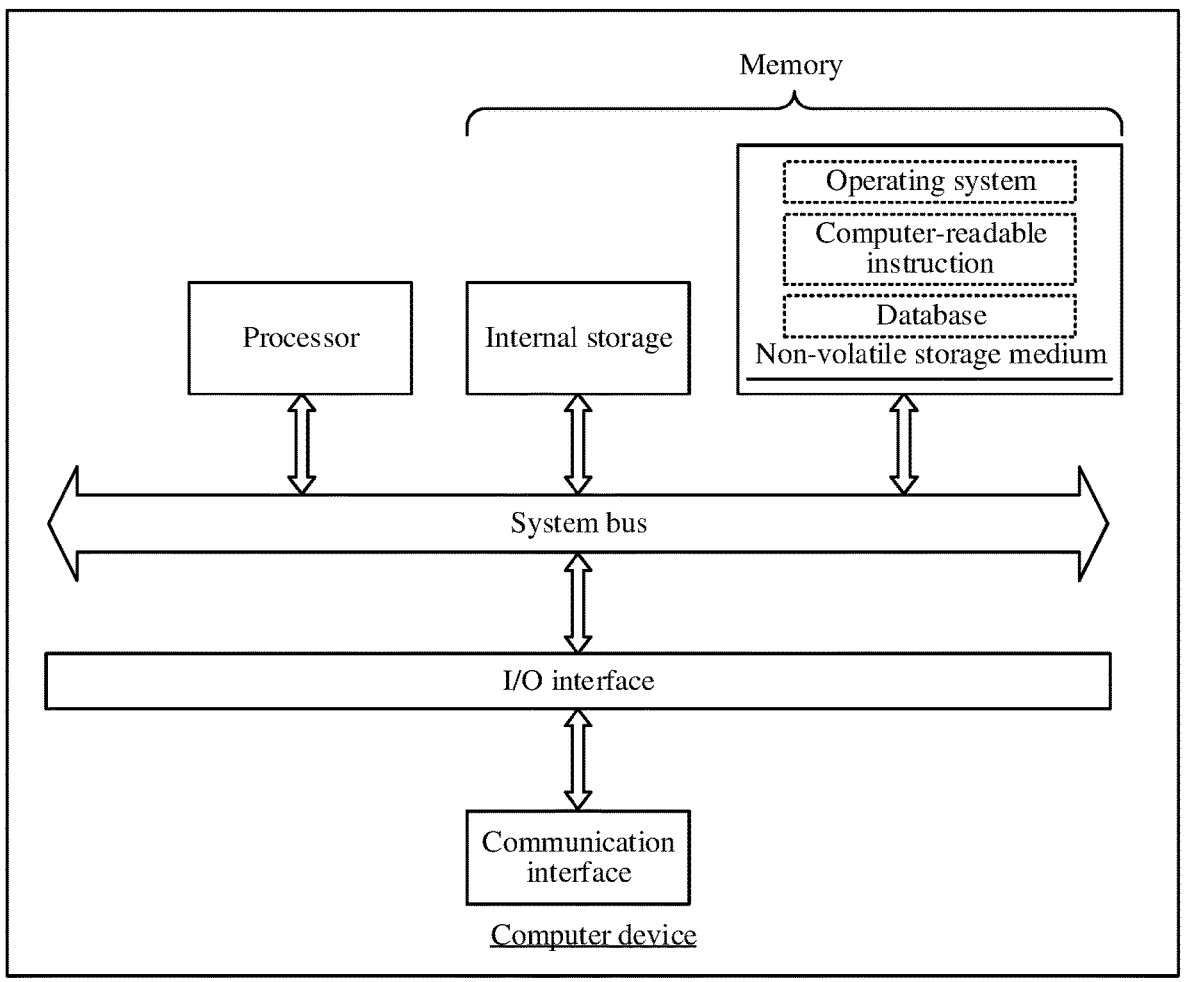
FIG. 12 is an internal structure diagram of a computer device according to one or more illustrative aspects described herein.

A person skilled in the art may understand that, the structure shown in FIG. 12 is merely a block diagram of a partial structure related to the solution in this application, and does not constitute a limitation on the computer device to which the solution in this application is applied. Specifically, the computer device may include more components or fewer components than those shown in the figure, or some merged components, or different component arrangements.

A computer device may be further provided, including a memory and a processor. The memory has a computer-readable instruction stored therein. The processor, when executing the computer-readable instruction, implements the operations in the foregoing illustrative methods.

A computer-readable storage medium may be provided, having a computer-readable instruction stored therein, the computer-readable instruction, when executed by a processor, implementing the operations in the foregoing illustrative methods.

A computer program product may be provided, including a computer-readable instruction, the computer-readable instruction, when executed by a processor, implementing the operations in the foregoing illustrative methods.

User information (including but not limited to user equipment information, user personal information, and the like) and data (including but not limited to data for analysis, stored data, displayed data, and the like) involved in this application are all information and data authorized by users or fully authorized by all parties. The collection, use, and processing of relevant data need to comply with the relevant laws, regulations, and standards of relevant countries and regions.

A person of ordinary skill in the art may understand that all or some of the processes of the method herein described may be performed by using a computer-readable instruction to instruct relevant hardware. The computer-readable instruction may be stored in a non-volatile computer-readable storage medium. When the computer-readable instruction is executed, the processes of the foregoing illustrative methods may be included. Any reference to the memory, the database, or other media used in the illustrative aspects provided in this application may include at least one of a non-volatile memory and a volatile memory. The non-volatile memory may include a read-only memory (ROM), a magnetic tape, a floppy disk, a flash memory, an optical memory, a high density embedded non-volatile memory, a resistive random access memory (ReRAM), a magnetoresistive RAM (MRAM), a ferroelectric RAM (FRAM), a phase change memory (PCM), a graphene memory, and the like. The volatile memory may include a RAM, an external cache memory, or the like. As a description rather than a limitation, the RAM may have various forms, such as a static RAM (SRAM) or a dynamic RAM (DRAM). The database may include at least one of a relational database and a non-relational database. The non-relational database may include, but is not limited to, a block-chain-based distributed database. The processor may be, but is not limited to, a general-purpose processor, a central processing unit, a graphics processing unit, a digital signal processor, a programmable logic device, a data processing logic device based on quantum computing, or the like.

Technical features may be combined in different manners to form other variations. To make the description concise, not all possible combinations of the technical features in the foregoing are described. However, the combinations of these technical features are considered as falling within the scope recorded in this specification provided that no conflict exists.

The foregoing merely expresses several implementations of this application. The descriptions thereof are relatively specific and detailed, but cannot be understood as limitations to the scope of this application. For a person of ordinary skill in the art, some transformations and improvements may be made without departing from the idea of this application. These transformations and improvements belong to the protection scope of this application. Therefore, the protection scope of this application shall be subject to the appended claims.

What is claimed is:

1. A method comprising:
   caching live streaming media source data;
   slicing, in response to a streaming media duration of the cached live streaming media source data reaching a target caching duration, the cached live streaming media source data, wherein the slicing is based on a preset slicing granularity, to obtain a plurality of independently codable streaming media segments, wherein the target caching duration is based on the preset slicing granularity;
   coding, in parallel, the plurality of streaming media segments, to generate respective coded video data; and
   merging the respective coded video data to obtain coded live streaming media data, the coded live streaming media data being configured for transmission to a live streaming client.

2. The method of claim 1, wherein a numerical value of the target caching duration is greater than a numerical value of the preset slicing granularity.

3. The method of claim 1, wherein the coding is performed by at least two coding servers having a combined code rate not less than a frame rate of the live streaming media source data.

4. The method according to claim 1, wherein the preset slicing granularity comprises an integer multiple of a granularity of a preset group of pictures, and the slicing comprises:
   collecting statistics about the streaming media duration of the cached live streaming media source data; and
   slicing the cached live streaming media source data based on the integer multiple of the granularity of the preset group of pictures.

5. The method according to claim 4, wherein the slicing comprises:

slicing the cached live streaming media source data at an equal granularity based on the integer multiple of the granularity of the preset group of pictures, to obtain a plurality of pieces of independently codable live streaming media slice data with a same duration; and respectively encapsulating the plurality of pieces of live streaming media slice data based on a target encapsulation format, to obtain a plurality of streaming media segments in the target encapsulation format.

6. The method according to claim 1, wherein a target quantity of streaming media segments are provided, and the coding is performed using at least the target quantity of coding servers.

7. The method according to claim 1, wherein the plurality of streaming media segments are in a target encapsulation format, and the coding comprises:

parallel decapsulation and decoding on streaming media segments in the target encapsulation format;

parallel encapsulation on the respective coded segments based on the target encapsulation format.

8. The method according to claim 1, further comprising:

obtaining the preset slicing granularity configured for processing of the live streaming media source data;

determining a live streaming processing delay based on the preset slicing granularity, the frame rate of the live streaming media source data, and an independent code rate of a coding server; and determining the target caching duration to be not less than the live streaming processing delay.

9. The method according to claim 1, wherein the merging comprises:

merging the respective coded video data of the coding servers based on a timestamp sequence, to obtain merged coded data; and performing encapsulation format conversion on the merged coded data, to obtain coded live streaming media data that is consistent with a live streaming transmission encapsulation format; and the method further comprises:

transmitting the coded live streaming media data to the live streaming client through a content delivery network (CDN) to be played on the live streaming client.

10. The method according to claim 3, further comprising:

determining a maximum overall code rate of the at least two coding servers; and adjusting a quantity of the at least two coding servers when it is determined that the maximum overall code rate does not match a numerical value of the frame rate of the live streaming media source data, so that the maximum overall code rate of the coding servers after adjustment matches the numerical value of the frame rate of the live streaming media source data.

11. The method according to claim 3, wherein the at least two coding servers are respectively configured to perform, by using coding operations, parallel coding on the streaming media segments obtained through the slicing, the coding operations comprising:

respectively dividing video frames of the streaming media segments to obtain respective coding units (CUs) of the video frames;

predicting the respective CUs of the video frames, and obtaining residual data of the CUS based on obtained predicted values; and coding the respective residual data of the video frames, to obtain coded video data of the streaming media segments.

12. The method according to claim 11, wherein the CU comprises a prediction unit (PU), and the predicting comprises:

predicting the respective PUs of the video frames based on a target prediction mode, to obtain predicted data, the target prediction mode being determined from intra-frame prediction and inter-frame prediction;

determining original residuals of the CUs, wherein the determination comprises determination based on the predicted data predicted by the PU; and performing data transformation on the original residuals of the CUs, to obtain the residual data of the CUs.

13. One or more non-transitory computer readable media storing computer readable instructions which, when executed by a processor, configure a data processing system to perform:

caching live streaming media source data;

slicing, in response to a streaming media duration of the cached live streaming media source data reaching a target caching duration, the cached live streaming media source data, wherein the slicing is based on a preset slicing granularity, to obtain a plurality of independently codable streaming media segments, wherein the target caching duration is based on the preset slicing granularity;

coding, by a plurality of coding servers in parallel, the plurality of streaming media segments, to generate respective coded video data; and merging the respective coded video data to obtain coded live streaming media data, the coded live streaming media data being configured for transmission to a live streaming client.

14. The computer readable media of claim 13, wherein the preset slicing granularity comprises an integer multiple of a granularity of a preset group of pictures, and the slicing comprises:

slicing the cached live streaming media source data at an equal granularity based on the integer multiple of the granularity of the preset group of pictures, to obtain a plurality of pieces of independently codable live streaming media slice data with a same duration; and respectively encapsulating the plurality of pieces of live streaming media slice data based on a target encapsulation format, to obtain a plurality of streaming media segments in the target encapsulation format.

15. The computer readable media of claim 13, wherein the plurality of streaming media segments are in a target encapsulation format, and the coding comprises:

parallel decapsulation and decoding on streaming media segments in the target encapsulation format;

parallel encapsulation on the respective coded segments based on the target encapsulation format.

16. The computer readable media of claim 13, further comprising:

obtaining the preset slicing granularity configured for processing of the live streaming media source data;

determining a live streaming processing delay based on the preset slicing granularity, the frame rate of the live streaming media source data, and an independent code rate of a coding server; and determining the target caching duration to be not less than the live streaming processing delay.

17. A system comprising:

one or more processors controlling operation of the system; and memory storing computer readable instructions which, when executed by the one or more processors, configure the system to perform:

caching live streaming media source data;

slicing, in response to a streaming media duration of the cached live streaming media source data reaching a target caching duration, the cached live streaming media source data, wherein the slicing is based on a preset slicing granularity, to obtain a plurality of independently codable streaming media segments, wherein the target caching duration is based on the preset slicing granularity;

coding, by a plurality of coding servers in parallel, the plurality of streaming media segments, to generate respective coded video data; and merging the respective coded video data to obtain coded live streaming media data, the coded live streaming media data being configured for transmission to a live streaming client.

18. The system of claim 17, wherein the preset slicing granularity comprises an integer multiple of a granularity of a preset group of pictures, and the slicing comprises:

slicing the cached live streaming media source data at an equal granularity based on the integer multiple of the granularity of the preset group of pictures, to obtain a plurality of pieces of independently codable live streaming media slice data with a same duration; and respectively encapsulating the plurality of pieces of live streaming media slice data based on a target encapsulation format, to obtain a plurality of streaming media segments in the target encapsulation format.

19. The system of claim 17, wherein the plurality of streaming media segments are in a target encapsulation format, and the coding comprises:

parallel decapsulation and decoding on streaming media segments in the target encapsulation format;

parallel encapsulation on the respective coded segments based on the target encapsulation format.

20. The system of claim 17, further comprising:

obtaining the preset slicing granularity configured for processing of the live streaming media source data;

determining a live streaming processing delay based on the preset slicing granularity, the frame rate of the live streaming media source data, and an independent code rate of a coding server; and determining the target caching duration to be not less than the live streaming processing delay.

* * * * *